United States Patent
Laftchiev et al.

(10) Patent No.: US 10,794,609 B2
(45) Date of Patent: Oct. 6, 2020

(54) METHODS AND SYSTEMS FOR PERSONALIZED HEATING, VENTILATION, AND AIR CONDITIONING

(71) Applicant: Mitsubishi Electric Research Laboratories, Inc., Cambridge, MA (US)

(72) Inventors: Emil Laftchiev, Cambridge, MA (US); Annamalai Natarajan, Amherst, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/888,172

(22) Filed: Feb. 5, 2018

(65) Prior Publication Data
US 2019/0242608 A1     Aug. 8, 2019

(51) Int. Cl.
*F24F 11/63*     (2018.01)
*F24F 11/80*     (2018.01)
(Continued)

(52) U.S. Cl.
CPC .............. *F24F 11/63* (2018.01); *F24F 11/80* (2018.01); *G05B 13/0295* (2013.01);
(Continued)

(58) Field of Classification Search
CPC ........ F24F 11/63; F24F 11/80; F24F 2120/20; G05B 13/0295; G05B 13/048; G05B 15/02; G05B 2219/2642
See application file for complete search history.

(56) References Cited

U.S. PATENT DOCUMENTS 6,726,113 B2    4/2004  Guo
6,760,716 B1 *  7/2004  Ganesamoorthi .... G05B 13/027
                                                          706/14
(Continued)

FOREIGN PATENT DOCUMENTS

WO    2010111444 A1    9/2010
WO    20140146046 A1   9/2014
(Continued)

OTHER PUBLICATIONS

Mao W., Yan G., Bai J., Li H. (2010) Regression Transfer Learning Based on Principal Curve. In: Zhang L., Lu BL., Kwok J. (eds) Advances in Neural Networks—ISNN 2010. ISNN 2010. Lecture Notes in Computer Science, vol. 6063. Springer, Berlin, Heidelberg, pp. 365-372. (Year: 2010).*
(Continued)

*Primary Examiner* — M. N. Von Buhr
(74) *Attorney, Agent, or Firm* — Gene Vinokur

(57) ABSTRACT

Systems and methods for controlling an operation of devices for an occupant. A processor to iteratively train a personalized thermal comfort model (PTCM) during an initialization period. Receive a sequence of unlabeled real-time data. A transmitter requests the occupant to label an instance of unlabeled data, when there is a disagreement between the labels of stored historical labeled data (LD) similar to received unlabeled data and a predicted label on the new unlabeled data that exceeds a threshold. The processor, in response to receiving the labeled data, trains the PTCM using different weights of the personalized LD than to the historical LD. Retrains PTCM using the historical database and the updated personalized database. A controller controls the set of devices based on the retrained PTCM.

20 Claims, 10 Drawing Sheets

(51) Int. Cl.
*G05B 13/02* (2006.01)
*G05B 13/04* (2006.01)
*G05B 15/02* (2006.01)
*F24F 120/20* (2018.01)

(52) U.S. Cl.
CPC .......... *G05B 13/048* (2013.01); *G05B 15/02* (2013.01); *F24F 2120/20* (2018.01); *G05B 2219/2642* (2013.01)

(56) References Cited

U.S. PATENT DOCUMENTS

| | | | | |
|---|---|---|---|---|
| 8,140,450 | B2* | 3/2012 | Porikli | G06N 20/00 |
| | | | | 706/12 |
| 8,700,227 | B2* | 4/2014 | Vass | G01K 1/045 |
| | | | | 700/300 |
| 10,126,010 | B2* | 11/2018 | Chen | G05B 13/0265 |
| 10,247,438 | B2* | 4/2019 | Bender | F24F 11/63 |
| 10,262,272 | B2* | 4/2019 | Chickering | G06N 20/00 |
| 2012/0031984 | A1 | 2/2012 | Feldmeier et al. | |
| 2014/0058539 | A1* | 2/2014 | Park | G05B 15/02 |
| | | | | 700/50 |
| 2014/0207292 | A1 | 7/2014 | Ramagem et al. | |
| 2016/0223215 | A1* | 8/2016 | Buda | G05B 15/02 |
| 2016/0320081 | A1* | 11/2016 | Nikovski | G05B 13/048 |
| 2017/0051934 | A1* | 2/2017 | Verhoeven | G05B 15/02 |
| 2017/0123440 | A1* | 5/2017 | Mangsuli | F24F 11/30 |
| 2019/0065908 | A1* | 2/2019 | Lee | G06K 9/6263 |
| 2019/0187635 | A1* | 6/2019 | Fan | F24F 11/65 |

FOREIGN PATENT DOCUMENTS

| | | |
|---|---|---|
| WO | 20160123536 A1 | 8/2016 |
| WO | 20160175219 A1 | 11/2016 |

OTHER PUBLICATIONS

Segev N., Harel, M., Mannor, S., Crammer, K., El-Yaniv, R. (2015) Learn on Source, Refine on Target: A Model Transfer Learning Framework with Random Forests. arXiv:1511.01258v2 [cs.LG] Nov. 8, 2015. (Year: 2015).*

* cited by examiner

METHODS AND SYSTEMS FOR PERSONALIZED HEATING, VENTILATION, AND AIR CONDITIONING

FIELD

The present disclosure relates generally to heating, ventilation, and air conditioning (HVAC) systems, and more particularly to automatic customization of adjustable settings, such as temperature set-points and an amount of latent heat transferred by the HVAC system, in order to maximize thermal comfort for an occupant(s) within a space, and minimize the HVAC system energy consumption.

BACKGROUND

Conventional HVAC systems in environments, such as office and residential buildings, are among the largest consumers of energy in the world, spending in excess of 40% of all energy, by some estimates. This is due to the large importance attached to indoor climate conditioning in modem society, and its impact on people's productivity and well-being. However, the continuous maintenance of thermal comfort with conventional HVAC systems are currently implemented in a suboptimal and inefficient manner, primarily because of the predominant very rudimentary way of communication between building occupants and HVAC systems.

For the most part, communication with conventional HVAC systems take place by either a wall thermostat or a remote control device, whose purpose is to turn the equipment on or off, and set temperature set-points. The on/off switch indicates when service is needed and when it is not. The temperature setting is a way of indicating a desired level of thermal comfort, in accordance with the needs and thermal condition of building occupants. For example, when an office worker has been sitting still at a desk for a long period of time on a cold winter day, the worker is likely to feel cold due to a lower metabolic rate, and request more heating by increasing the temperature set-point. Similarly, when a manual laborer has been performing vigorous physical work on a hot and humid summer day, the worker is likely to feel very hot, and can request more cooling by lowering the temperature set-point.

In principle, the conventional HVAC controls (on/off switch and temperature set-points) should be able provide thermal comfort, when possible. However, in practice, this almost never happens, due to a number of reasons. At least one reason is that constant manual readjustment of temperature set-points is not practical, and would present a major distraction for most building occupants. For example, in real life, such readjustment happens only when indoor climate becomes drastically uncomfortable, which results in building occupants not satisfied or productive.

Another reason the conventional HVAC constant manual readjustment of temperature set-points is not practical, is that even when an occupant is willing to adjust the temperature set-point, the occupant rarely knows what the optimal value is, among other reasons. As mentioned above, that value depends a lot on the current level of physical activity, respectively metabolic rate, the humidity of air, the clothing worn by the occupant(s), as well as an amount of radiant heat radiated by other objects in the room, along with external heat sources such as the sun.

Models for predicting thermal comfort for occupants is illustrated in ISO 7730 and ASHRAE 55, however, such models are not practical for building occupants to determine optimal temperatures correctly. For example, these models provide only a sign of needed correction is determined, e.g., temperature up or down, with further corrections being necessary later, at a cost to the building occupants of more wasted time and distraction from productivity. Another problem with these models, among many problems, is over-correction is frequently an observed phenomenon, such that when occupants feels cold, often the decision to address the cold feeling by the occupants resulting in choosing unnecessarily high temperature set-point, which results in bringing the room temperature to another uncomfortable state, making the occupant feel too hot. Once again, these models present a bad experience for the building occupants resulting at a cost of even more wasted time and distraction from productivity to the building occupants.

Another reason the conventional HVAC constant manual readjustment of temperature set-points is not practical, is the suboptimal regulation of thermal comfort temperature sensors of conventional HVAC systems. For example, conventional HVAC sensors are located at the HVAC device/system itself, and measure temperature of return air before entering the intake of the HVAC device. This presents many problems, for example, at least one problem is building occupants typically are not interested in air temperature at that location, i.e. at the intake of the conventional HVAC system. Rather, occupants need comfortable temperature at their specific locations within the building. Because the occupant(s) location(s) is typically far from the conventional HVAC device, and there are significant temperature gradients that exist in building zones, air temperature sensed and regulated by the conventional HVAC device is different from that which is experienced by occupant is a specific building zone. Resulting in building occupant(s) being uncomfortable and requesting or manually adjusting the specific building zone environment, which again wastes time and distracts occupants from productivity along with increasing energy costs.

Another conventional thermal comfort monitor includes monitoring devices that attempts to determine the actual comfort level in a room from sensor measurements (U.S. Pat. No. 8,700,227 by Vass et al.). However, there are problems with the Vass model, for example, at least one problem, among many, is that measurements are sensed in an area where the occupant is located. The Vass model fails in at least one respect, among many, in that the sensed measurements are not, to a particular occupant, and not at the occupant, i.e. his/her, condition and/or location within the room.

Other conventional thermal comfort model problems not yet addressed include, is in building environments where there are multiple occupants sharing the same room, i.e. climate condition. For example, since multiple occupants occupy the same thermally controlled HVAC zone, the multiple occupants are restricted in adjusting the climate controls. Some problems result in such a multiple occupant shared space, in that many of the occupants are in significant discomfort due to the temperature being too hot or cold. Other problems with conventional thermal comfort models, include the thermal conditioning by the HVAC systems for empty zones or non-occupied zones, such as conference rooms and laboratories. Such thermal conditioning of empty zones results in a significant expense and wasted resources. Even when the zone is occupied, the conventional thermal comfort models is very challenged in determining an optimal temperature set-point that can satisfy the current set of occupants.

Accordingly, there is need to achieve better thermal comfort for an occupant(s) within a space, as well as better HVAC performance, among other things. For example, some needs to be addressed include an automated method for controlling HVAC equipment capable of maximizing thermal comfort for one or more zone occupants. Where each occupant within the zone can have their own specific preferences recognized, without the need for excessive manual interaction with the HVAC device, while at the same time capable of exploiting energy efficiency.

SUMMARY

The present disclosure relates to providing systems and methods for automatic customization of adjustable settings, such as temperature set-points and an amount of latent heat transferred by the HVAC system, in order to maximize thermal comfort for an occupant(s) within a space, and minimize the HVAC system energy consumption.

Some embodiments of present disclosure are based on a realization that it is advantageous to control heating, ventilation, and air conditioning (HVAC) systems according to a thermal comfort model describing thermal comfort of an occupant in the conditioned environment. For example, some present disclosure embodiments of the thermal comfort relate the thermal comfort of the occupant with biometric data of the occupant and data of the condition within the environment. Through experimentation, these present disclosure thermal comfort embodiments/models also optimize the thermal comfort of an occupant of the environment while reducing the energy consumption of the HVAC system. However, during experimentation the creation of these thermal comfort embodiments/models had to overcome many challenges.

For example, some embodiments of the present disclosure recognize the capability to create a thermal comfort model describing an average thermal comfort a group of people within an environment. However, learned through experimentation, these thermal comfort models relied on estimating an average thermal comfort of an average user, which later failed to accurately predict comfort of a specific user, and/or a specific group of users in a conditioned environment. Specifically, this average thermal comfort model proved to be non-personalized for the needs of a specific user, and/or for occupants of the conditioned environment.

Some embodiments of the present disclosure recognize the capability to create a personalized thermal comfort model of an occupant of the environment based on information provided by that occupant himself or herself. However, from experimentation, it was learned the creation of such personalized thermal comfort models required labeled data about a comfort level from the occupant in different environmental conditions. Also learned from experimentation, was that trying to obtain such labeled data was a challenging task to overcome. As used herein, the phrase labeled data can be referred to as data sets, where each data point can be labeled with some label of interest. For example, each value of temperature measurements of at least one temperature sensor can be associated with a user/occupant feeling, including a cold comfort range, a cool comfort range, a comfortable comfort range, a warm comfort range and a hot comfort range. If the user reported his/her feeling for each value, then the data set is fully labeled. If the user reported his/her feeling once or twice, then the data set can include only one or two labeled examples, and is only partially labeled.

Examples of the data to be labeled can include various combinations of biometric data of the occupant, e.g. vital signs of the occupant, and the environmental data, e.g., temperature, humidity, airflow in the conditioned environment. In a number of situations, obtaining such data measurements of the instances of the unlabeled data was not challenging. For example, the biometric data can be measured by a wearable device, e.g., a smart watch, worn by the user, while the environmental data can also be measured by the wearable device and/or by various sensors installed in the environment.

To that end, in the creation of the personalized thermal comfort models, some embodiments faced the problem when the unlabeled data for each individual user was in abundance, requiring a copious amount of further input from the user to label the instance of unlabeled data. However, obtaining such input information from the user can be unreasonable, if the user is consistently requested to provide a feedback in quantities sufficient to train the thermal comfort model. Further, not only is the user expected to provide a lot of labels to unlabeled data, but the benefit for the user is delayed, wherein the reward from benefiting from such a model occurs, only after the user has provided several hundred labels or more.

Some embodiments are based on recognition that a thermal comfort model can be created based on data provided by different users of HVAC systems to describe the aggregated thermal comfort for a group of people. However, such a model can also fail to accurately predict individual comfort in the real world, because each user in a group may have different comfort preferences. Notably, the labels requested from the user to train the models are subjective and regular techniques used by the active learning to train the model from the feedback by multiple users are ill suited in the scenario of personalized thermal control.

Some embodiments are based on realization that a personalized thermal comfort model can be learned with a hybrid approach using both the labeled data provided by a user of that personalized thermal comfort model, and labeled data provided by other users, i.e. historical occupant data. Such a hybrid approach allows reducing a number of labeled data instances requested from the user in order to train the personalized thermal comfort model for the user, which reduces the disturbance to the user and increase her/his willingness to provide a feedback. In addition, the hybrid approach allows reducing the waiting time for starting utilization of that trained model to control the HVAC in the environment occupied by the user, which in turn reduce the energy consumption of the HVAC system. In addition, the reduction of requests for the feedback information can reduce the memory, network traffic, and computational requirements of the system for building the personalized thermal comfort model.

However, the naïve use of the hybrid approach by combining the feedback of the user with feedback from other users can reduce the accuracy of the personalized thermal comfort model when the other users providing the feedback for the model have different comfort preferences. To that end, some embodiments modify hybrid approach to address this limitation.

For example, some embodiments build the personalized thermal comfort model for a user using different model weights for the labeled data in a personalized database provided by the user and the labeled data in a common database provided by other users. This approach allows to consider the reliability of the labeled data provided for learning and/or training the model.

Additionally, when the new feedback is received from the user, some embodiments, instead of updating the model with this new instance of the labeled data, append this new instance of the labeled data to the personalized database, and retrain the model from scratch. This approach can allow for more rapid leaning of the model towards the data provided by the user.

Further, retraining of the model allows to adjust the weights for the user's feedback data during the training. For example, in some embodiments, the weights for the labeled data in a personalized database provided by the user and/or weights for the labeled data in a common database provided by other users are functions of a number of instances of labeled data in the personalized database and/or a function of a ratio of a number of instances of labeled data in the personalized database and a number of instances of labeled data in the common database. In such a manner, those embodiments can decrease the influence of the labeled data in the common database on the trained model. For example, when the personalized database has the sufficient number of labeled data instances, some embodiments phase out the labeled data from the common database without interrupting the control of the HVAC system. For example, one embodiment, after accumulating a certain number of labeled instances in the personalized database, uses only the personalized database and the tuned personalized model weights for future training and/or update of the model.

Some embodiments are based on understanding that different techniques borrowed from the field of the active machine learning can be used to reduce a number of feedback requests to the user. However, those techniques are used to incrementally increase the quality of the model built based on the provided feedback. In this case, however, the model is not trusted at the beginning. To that end, a different active learning method is desired.

Specifically, some embodiments, instead of testing a confidence of the model in prediction of the thermal comfort for current conditions, test the agreement of the labeled data in the common database for the current conditions with a predicted label for the unlabeled data instant. The user receives the feedback request when the other users expressing the opinion on their comfort in the current conditions are in disagreement with the assumed current label which is predicted. For example, if for the conditions similar to the current conditions including one or combination of current values of biomedical parameters of the user and current values of the environmental parameters in the conditioned environment, all other users indicate their comfort, probably those conditions are comfortable for the user of the personalized thermal comfort model. In contrast, when for the same conditions, some users are comfortable and some are not, the feedback request for the user to express her comfort is justified. This approach allows to reduce the number of the request for the feedback without relying on the accuracy of the personalized thermal comfort model.

Further some embodiments of the present disclosure can provide for label-efficient methods of finding personalized thermal comfort models, using a transfer active learning framework modified for a quick start modeling and streaming-based active learning. For example, the transfer active learning framework can incorporate at least two active learning querying strategies in a regression settings which can be used in the stream-based setting, among other things. Further, aspects of the present disclosure leverage prior knowledge, i.e. historical data or historical labeled data, to rapidly learn a prediction model of thermal comfort and adjust the model when given only a few labeled examples of data.

According to an embodiment of the present disclosure, a system for controlling an operation of a set of devices for an occupant. The system including a memory having stored historical data including labeled data in a historical database. Wherein each instance of the labeled data is indicative of a thermal comfort level of at least one occupant in different conditions of at least one environment. A hardware processor to iteratively train a personalized thermal comfort model stored in the memory during an initialization period. An input interface to receive a sequence of unlabeled real-time data including measurements of biometric data of the occupant, measurements of environmental data in the environment the occupant is located, or both. A transmitter to request the occupant to label an instance of unlabeled data, when there is a disagreement between labels of stored historical labeled data similar to the received unlabeled data with respect to a predicted label on the unlabeled data that exceeds a predetermined disagreement threshold. Wherein, in response to the labeling the instance of unlabeled data, the hardware processor stores the labeled instance of unlabeled data as personalized labeled data in a personalized labeled database in the memory. The hardware processor trains the personalized thermal comfort model using different weights of the stored personalized labeled data compared to the stored historical labeled data. Such that for each iteration during the initialization period, updates the personalized labeled database with the personalized labeled data. Retrains the personalized thermal comfort model using the historical database and the updated personalized database. Finally, a controller to control the set of devices based on the retrained personalized thermal comfort model.

According to another embodiment of the present disclosure, a method for controlling an operation of a set of devices for an occupant. The method including using a memory having stored data including labeled data in a historical database. Wherein each instance of the labeled data is indicative of a thermal comfort level of at least one occupant in different conditions of at least one environment. Using a hardware processor to iteratively train a personalized thermal comfort model stored in the memory during an initialization period. Receiving, via an input interface, a sequence of unlabeled real-time data including measurements of biometric data of the occupant, measurements of environmental data in the environment the occupant is located, or both. Requesting, via a transmitter, the occupant to label an instance of unlabeled data, when there is a disagreement between the labels of stored historical labeled data similar to the received unlabeled data and a predicted label on the unlabeled data point that exceeds a predetermined threshold. Using the input interface to receive, a response back from the occupant including labeling the instance of unlabeled data. The hardware processor stores the labeled instance of unlabeled data as personalized labeled data in a personalized labeled database in the memory. Trains the personalized thermal comfort model using different weights of the stored personalized labeled data than to the stored historical labeled data. Such that for each iteration during the initialization period, updates the personalized labeled database with the personalized labeled data, and retrains the personalized thermal comfort model using the historical database and the updated personalized database. Finally, controlling, via a controller, the set of devices based on the retrained personalized thermal comfort model.

According to another embodiment of the present disclosure, a system for controlling an operation of a heating ventilation and air conditioning (HVAC) system for an occupant. The system including a memory having stored historical data including labeled data in a historical database.

Wherein each instance of the labeled data is indicative of a thermal comfort level of at least one occupant in different conditions of at least one environment. A hardware processor to iteratively train a personalized thermal comfort model stored in the memory during an initialization period. Wherein the personalized thermal comfort model prior to being stored in the memory, is initialized with the historical labeled data and a transfer learning algorithm, which results in limiting a search space for training the personalized thermal comfort model during the initialization period. An input interface to receive a sequence of unlabeled real-time data including measurements of biometric data of the occupant, measurements of environmental data in the environment the occupant is located, or both. A transmitter to request the occupant to label an instance of unlabeled data, when there is a disagreement between labels of stored historical labeled data similar to the received unlabeled data with respect to a predicted label on the unlabeled data that exceeds a predetermined disagreement threshold. Wherein, in response to the labeling the instance of unlabeled data, the hardware processor stores the labeled instance of unlabeled data as personalized labeled data in a personalized labeled database in the memory. Trains the personalized thermal comfort model using different weights of the stored personalized labeled data compared to the stored historical labeled data. Such that for each iteration during the initialization period, updates the personalized labeled database with the personalized labeled data, and retrains the personalized thermal comfort model using the historical database and the updated personalized database. Finally, a controller to control the HVAC system based on the retrained personalized thermal comfort model.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
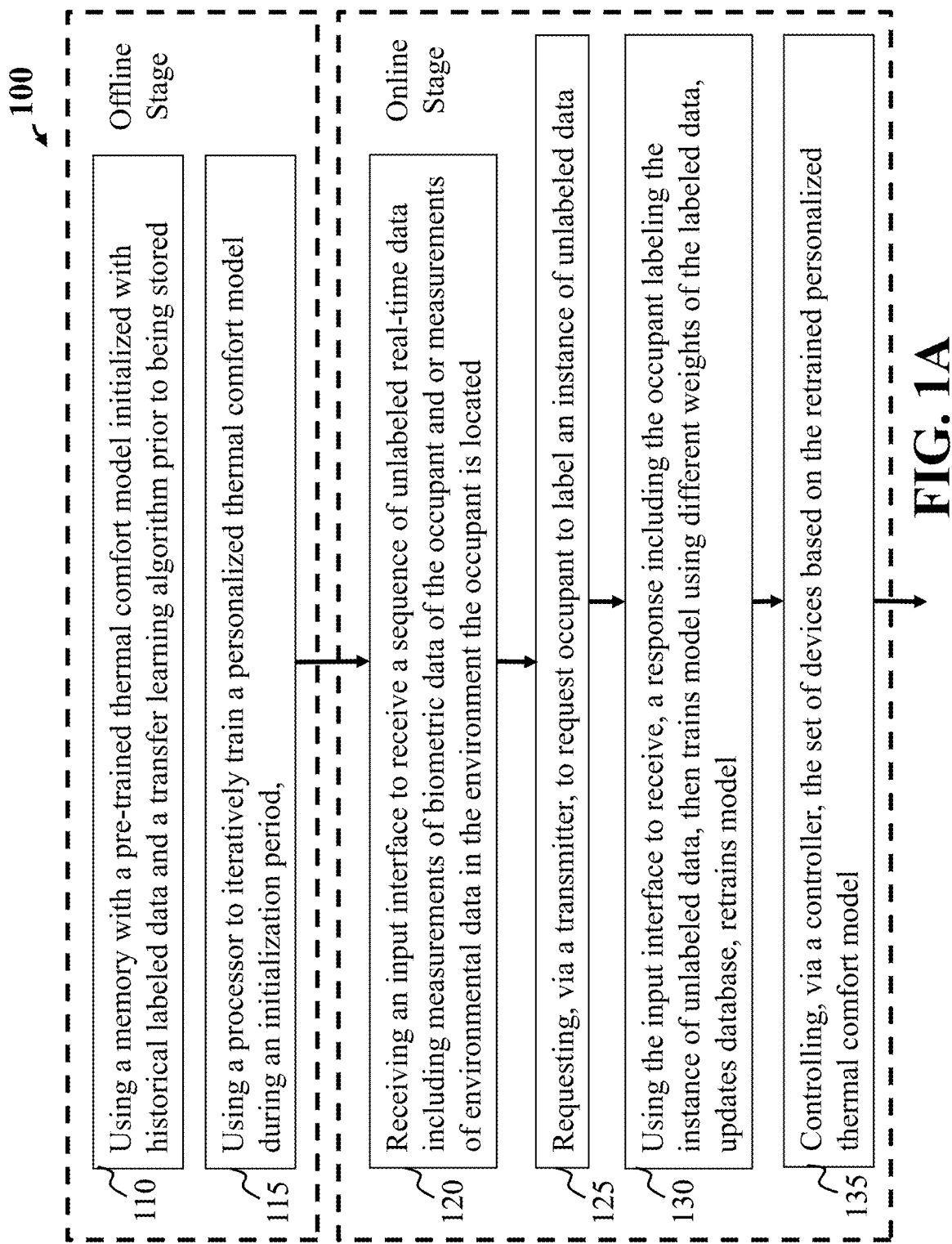
FIG. 1A is a flow diagram illustrating a method for controlling an operation of a set of devices for an occupant, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

The present disclosure relates to providing systems and methods for automatic customization of adjustable settings, such as temperature set-points and an amount of latent heat transferred by the HVAC system, in order to maximize thermal comfort for an occupant(s) within a space, and minimize the HVAC system energy consumption.

Some embodiments are based on the realization that it is advantageous to control heating, ventilation, and air conditioning (HVAC) systems according to a thermal comfort model describing thermal comfort of an occupant in the conditioned environment. Wherein the models include the thermal comfort of the occupant with biometric data of the occupant and data of the condition within the environment.

Another realization is based on recognizing the capability to create a personalized thermal comfort model of an occupant of the environment based on information provided by that occupant himself or herself. However, such personalized thermal comfort models required hundreds of occupant labeled data about a comfort level of the occupant in different environmental conditions, resulting in such models impractical in some ways due to such a large input data needed from the user. The term labeled data can be referred to as data sets where each data point is labeled with some label of interest. For example, each value of temperature measurements of at least one temperature sensor can be associated with a user/occupant feeling, including a cold comfort range, a cool comfort range, a comfortable comfort range, a warm comfort range and a hot comfort range. Further, if the user reported his/her feeling for each value, then the data set can be labeled. If the user reported his/her feeling once or twice, then the data set can include only one or two labeled examples. For example, the thermal comfort levels of the occupant can include a cold comfort range of about 59° F. to 65° F. and below, a cool comfort range of about 61° F. to 67° F. and below, a comfortable comfort range of about 68° F. to 72° F. or 65° F. to 74° F., a warm comfort range of about 70° F. to 75° F. and above or 72° F. to 77° F. and above, and a hot comfort range of about 73° F. to 75° F. and above or a range of about 74° F. to 80° F. and above. Of course, these temperature ranges vary from user to user, and are even subjective depending upon other factors, i.e. humidity, room air speed, room sun illumination, occupant heart rate, occupant activity level, occupant health, occupant state of alertness, etc. Wherein the environment the occupant feels the thermal comfort level can be one of an interior of a building, a partial interior of a building, a structure having a roof and at least one wall or a structure that is constructed.

Examples of the data to be labeled can include various combinations of biometric data of the occupant, e.g. vital signs of the occupant, and the environmental data, e.g., temperature, humidity, airflow in the conditioned environment. In a number of situations, it is not difficult to get measurements of the instances of the unlabeled data. For example, the biometric data can be measured by a wearable device, e.g., a smart watch, worn by the user, while the environmental data can also be measured by the wearable device and/or by various sensors installed in the environment. To that end, in the creation of a personalized thermal comfort model, some embodiments face the problem when the unlabeled data for each individual user are in abundance, requiring further input from the individual user. However, obtaining such input information from the individual user can be unreasonable to request from the user to provide a feedback in quantities sufficient to train the thermal comfort model. Further, not only is the user expected to provide a lot of labels, but the benefit for the user is delayed, wherein the reward from benefiting from such a model occurs, only after the user providing several hundred labels or more.

Some embodiments are based on recognition that a thermal comfort model can be created based on data provided by different users of HVAC systems to describe the aggregated thermal comfort for a group of people. However, such a model can also fail to accurately predict individual comfort in the real world because each user in a group may have different comfort preferences. Notably, the labels requested from the user to train the models are subjective and regular techniques used by the active learning to train the model from the feedback by multiple users are ill suited in the scenario of personalized thermal control.

Some embodiments are based on realization that a personalized thermal comfort model can be learned with a hybrid approach using both the labeled data provided by a user of that personalized thermal comfort model, and labeled data provided by other users, i.e. historical occupant data. Such a hybrid approach/framework allows for reducing a number of labeled data instances requested from the user in order to train the personalized thermal comfort model for the user, which reduces the disturbance to the user and increase her/his willingness to provide a feedback. In particular, this framework combines machine learning fields of active and transfer learning, to reduce the labeling effort needed to obtain an accurate model of thermal comfort.

In other words, aspects of the present disclosure include the transfer learning which is a type of machine learning, where knowledge from one domain is transferred to another with a goal of facilitating learning. In at least one embodiment, domains refer to different users, specifically source domain would pertain to data from N−1 users, and target domain would refer to data from the $N^{th}$ user. When the domains of data are described in this manner, and when labeled data are available in both source and target domains, then a transfer learning approach can be taken herein as an inductive transfer learning approach. Wherein at least one aspect of novelty of the present disclosure can be that there is no assumption of having access to all labeled data in the target domain, among other aspects. By non-limiting example, at least one approach to inductive transfer learning can be parameter transfer, where the assumption is that parameters for individual models for similar tasks should be sampled from the same prior distribution, or like prior distribution.

In addition, this hybrid approach, as noted above, allows for reducing the waiting time for starting utilization of that trained model to control the HVAC in the environment occupied by the user, which in turn reduce the energy consumption of the HVAC system. Further, the reduction of requests for the feedback information can reduce the memory, network traffic, and computational requirements of the system for building the personalized thermal comfort model. However, such a hybrid approach of combining feedback of the user with feedback from other users, can reduce accuracy of the personalized thermal comfort model, when other users provide feedback for the model that have different comfort preferences.

Further, this hybrid approach considers a parameter transfer for regression problems, when the setup data in the target domain consists of a few labeled data instances provided by the target user. Hence, an aspect of some approaches to the present disclosure is that parameter sharing can be sequential, where the parameters in the source domain are first learned, and this information is ultized as data that becomes available in the target domain. For example, several users have provided data through usage of the system. Their data is used to learn a generic thermal comfort model in the source domain. When a new user is given the system, the generic model is provided as information that will be used to reduce the feedback effort of the new user.

Specifically, this approach to parameter sharing is first learning the source domain parameters, i.e. learn a generic model of thermal comfort in the source domain and second, to penalize the deviation of target domain model parameters from source domain model parameters, i.e. allow the new user to have a personalized model, but only one which is similar to the general model of thermal comfort. At least one added benefit and added advantage can be that in the absence of target domain data, the prediction model can fall back on the source domain model to make predictions which is better than random guessing.

To that end, some embodiments modify the hybrid approach to address this limitation by building the personalized thermal comfort model for a user using different model weights for the labeled data in a personalized database provided by the user, and the labeled data in a common database provided by other users. This approach allows to consider the reliability of the labeled data provided for learning and/or training the model. Additionally, when new feedback is received from the user, instead of updating the model with this new instance of the labeled data, an action can be initiated to append this new instance of the labeled data to the personalized database, and retrain the model from scratch. Thus, this approach can allow for more rapid leaning of the model towards the data provided by the user, among other things.

Further, retraining of the model can allow to adjust the weights for the user's feedback data during the training. For example, in some embodiments, the weights for the labeled data in a personalized database provided by the user and/or weights for the labeled data in a common database provided by other users are functions of a number of instances of labeled data in the personalized database and/or a function of a ratio of a number of instances of labeled data in the personalized database and a number of instances of labeled data in the common database. In such a manner, those embodiments can decrease the influence of the labeled data in the common database on the trained model. For example, when the personalized database has the sufficient number of labeled data instances, some embodiments phase out the labeled data from the common database without interrupting the control of the HVAC system. For example, one embodiment, after accumulating a certain number of labeled instances in the personalized database, uses only the personalized database and the tuned personalized model weights for future training and/or update of the model.

FIG. 1A is a block diagram illustrating a method for controlling an operation of a set of devices for an occupant, according to embodiments of the present disclosure.

Step 110 includes method 100 using a memory with a pre-trained personalized thermal comfort model. The stored pre-trained personalized thermal comfort model is initialized with the historical labeled data and a transfer learning algorithm, prior to being stored, and prior to the iterative training of the personalized thermal comfort model, which uses real-time data and an active learning algorithm.

The transfer learning algorithm can be a type of machine learning where knowledge from one domain is transferred to another with the goal of facilitating learning, according to the present disclosure. For example, according to the setup for embodiments of the present disclosure, given N users, domains refer to different users, specifically source domain would pertain to data from N−1 users (historical labeled data) and target domain would refer to data from the Nth user (personalized labeled data). Predicting thermal comfort falls under inductive transfer learning where labeled data are available in both source and target domains, however, the difference in accordance with the embodiments of the present disclosure in contrast to conventional transfer learning algorithms, is that there is not an assumption to having access to all labeled data in target domain. Specifically, at least one aspect of a transfer active learning framework can be to minimize the feedback gathered per user, via active learning, while leveraging domain knowledge from other users via transfer learning. To accomplish this reduction in required labeling, the framework leverages knowledge from a few base users, i.e. a group of initial user's part of a controlled experiment, using transfer learning, to obtain a transfer active learning framework that is modified for quick start modeling and streaming-based active learning.

Step 115 includes method 100 using a hardware processor to iteratively train the personalized thermal comfort model during an initialization period. The personalized thermal comfort model is for an occupant in an environment, that is based on information provided by that occupant himself or herself. The personalized thermal comfort model can be one or combination of a regression function, a neural network, a classifier or a support vector machine, depending upon the specific application.

Still referring to step 115 of FIG. 1A, the hardware processor iteratively trains the personalized thermal comfort model, based on a regularization of the personalized thermal comfort model with respect to the pre-trained thermal comfort model with historical labeled data, which limits a search space for training the personalized thermal comfort model during the initialization period. Regularization can be termed as adding a cost to models that are significantly different from the pre-trained thermal comfort model based on the historical labeled data.

Still referring to step 115 of FIG. 1A, the personalized thermal comfort model is iteratively trained using active and transfer learning, until a level of accuracy of the personalized thermal comfort model is above a threshold, then the personalized thermal comfort model can be used until the occupant decides he is uncomfortable and provides a real-time label to the observed data. The threshold can be determined in a number of ways including: setting the threshold to be equal to ½ a point on the thermal comfort scale, using learning to discern an error level beyond which the user is typically comfortable, or other suitable methods, or depending upon a particular application. The threshold will typically be based on the internationally accepted thermal comfort scale, or on the historical labeled data in the historical database.

The memory has stored data that can include a historical database having the historical labeled data. The memory can also store, during the implementation of the system 100, personalized labeled data in a personalized labeled database. Wherein each instance of the labeled data (historical and personalized) is indicative of a thermal comfort level of at least one occupant in different conditions of at least one environment.

The stored thermal comfort model can be based on historical labeled data. The historical data can include a sequence of instances of data that include at least one sample occupant data, sample environmental data and sample thermal comfort levels selected by at least one sample occupant in the sample environment based on use history data on a device provided by the at least one sample occupant, to devices in a set of sample devices, such that the sample environment data is one of a different environment then the occupant's environment, a same environment of the occupant's environment, or both. Wherein the thermal comfort level data includes instances of data indicative of a comfort of the sample occupant in different conditions of at least one sample environment. Further, some data of the historical data can be from the current user (occupant) gathered at some earlier point in time prior to the method being implemented, which is compared to the user's current use of the system 100.

Still referring to step 115 of FIG. 1A, in particular, the historical labeled data can be measurements of biometric data of sample occupants or measurements of environmental data in sample environments, similar to the current user's biometric data or similar to current measurements of environmental data to the user's environment. Wherein, the thermal comfort levels of the occupant can include a cold comfort range, a cool comfort range, a comfortable comfort range, a warm comfort range and a hot comfort range.

The personalized labeled data can include the occupant labeling an instance of unlabeled data that is stored in the memory as personalized labeled data. As noted above, each instance of the occupant labeled data is indicative of a thermal comfort level of at least one occupant in different conditions of at least one environment.

Step 120 includes receiving a sequence of unlabeled real-time data including measurements of biometric data of the occupant and measurements of environmental data in the environment the occupant is located. The sequence of data can include data obtained for a period of time, ranging from less than one second to an hour, a week, a month or a year. For example, the unlabeled real-time data can be data relating to measurements of biometric data of the occupant such as, a heart rate, a skin temperature, a galvanic skin response, an altimeter reading, a gyroscope reading, an accelerometer reading, a light level indicator or a clothing sensor. Other unlabeled real-time data can include measurements of environmental data in the environment the occupant is located, that can include data such as temperature, brightness, sound, an amount of airflow or an amount of sunlight.

Step 125 includes requesting the occupant to label an instance of unlabeled data, when there is a disagreement between the labels of stored historical labeled data similar to the received unlabeled data with respect to a predicted label of the unlabeled data point. When the disagreement within the historical data is higher than a predetermined threshold, then a label is requested. To obtain historical disagreement, we first determine the K nearest neighbors of the unlabeled (new) data point. We then calculate a disagreement score between the labels of the K nearest neighbors and a predicted label on the unlabeled data point and if this score exceeds a threshold, the algorithm requests a label.

The predetermined threshold can be chosen by many methods that include, choosing the highest disagreement when all new user data is known, pre-computing the disagreement among all historical data and setting the threshold to a percentage of the disagreement scores, setting the disagreement as a function of the desired modeling error metric, etc, or some other method depending upon a particular aspect.

Step 130 includes receiving a response from the occupant including the occupant labeling the instance of unlabeled data. In response to the labeling the instance of unlabeled data, the hardware processor stores the labeled instance of unlabeled data as personalized labeled data in a personalized labeled database in the memory. The hardware processor then trains the personalized thermal comfort model using different weights of the stored personalized labeled data than compared to the stored historical labeled data. Such that, for each iteration during the initialization period, the hardware processor updates the personalized labeled database with the personalized labeled data, and retrains the personalized thermal comfort model using the historical database and the updated personalized database.

Step 130 combines active learning with transfer learning as an approach to reduce the labeling effort for thermal comfort modeling. In regard to active learning according to the present disclosure, active learning is a type of machine learning where a prediction model achieves good performance when it is allowed to choose which examples to learn from. An active learner chooses a sample to be labeled via querying and then requests an oracle to provide a label for the chosen sample. Active learning for regression can be subdivided into model free and model-based approaches.

The model-free strategies are active learning approaches that do not rely on a prediction model to determine which data samples to label. Instead these approaches rely only on the statistics of the data distribution. The difficulty faced in model-free active learning approaches in regard to the present disclosure embodiments, is that successive queries do not account for prior knowledge gained and often end up issuing redundant queries. Therefore, the model-free active learning approach is not suitable for the present disclosure embodiments, because when the problem setting involves human user labeling there is an extreme constraint with respect to the number of queries that a user is willing to label.

Still referring to step 130, model-based active learning for the case of building a regression model focus on minimizing the model variance, such that the total generalization error is minimized. The challenge in using variance reduction techniques for regression is that the statistics must be computed on the whole data distribution, and is therefore not feasible to be computed when samples arrive one at a time. This is important because the embodiments of the present disclosure are to be transplanted into the stream-based setting where knowledge of the complete data distribution is unknown. Here, a stream based setting indicates that the data is evaluated as it is observed by the sensors and is not stored prior to evaluation. This is different than conventional approaches which require or needed all new data to be collected prior to any evaluation.

Embodiments of the present disclosure provide unique aspects, by non-limiting example, first there is not a reliance on computing importance weights to handle covariate shift, when combining transfer and active learning approaches. Such that, these importance weights are computed by estimating probability densities of marginal distribution in the source and target domain. This is challenging in datasets which are high dimensional but have a low sample counts, which is the case for the dataset for embodiments of the present disclosure. Second, both model free and model-based approaches cannot be deployed to a stream based settings, and must be necessarily re-worked. In contrast, embodiments of the present disclosure include approaches that can be deployed with minimal changes to the stream-based setting, among other things.

Step 135 includes controlling the set of devices based on the retrained personalized thermal comfort model.

Figure 1B:
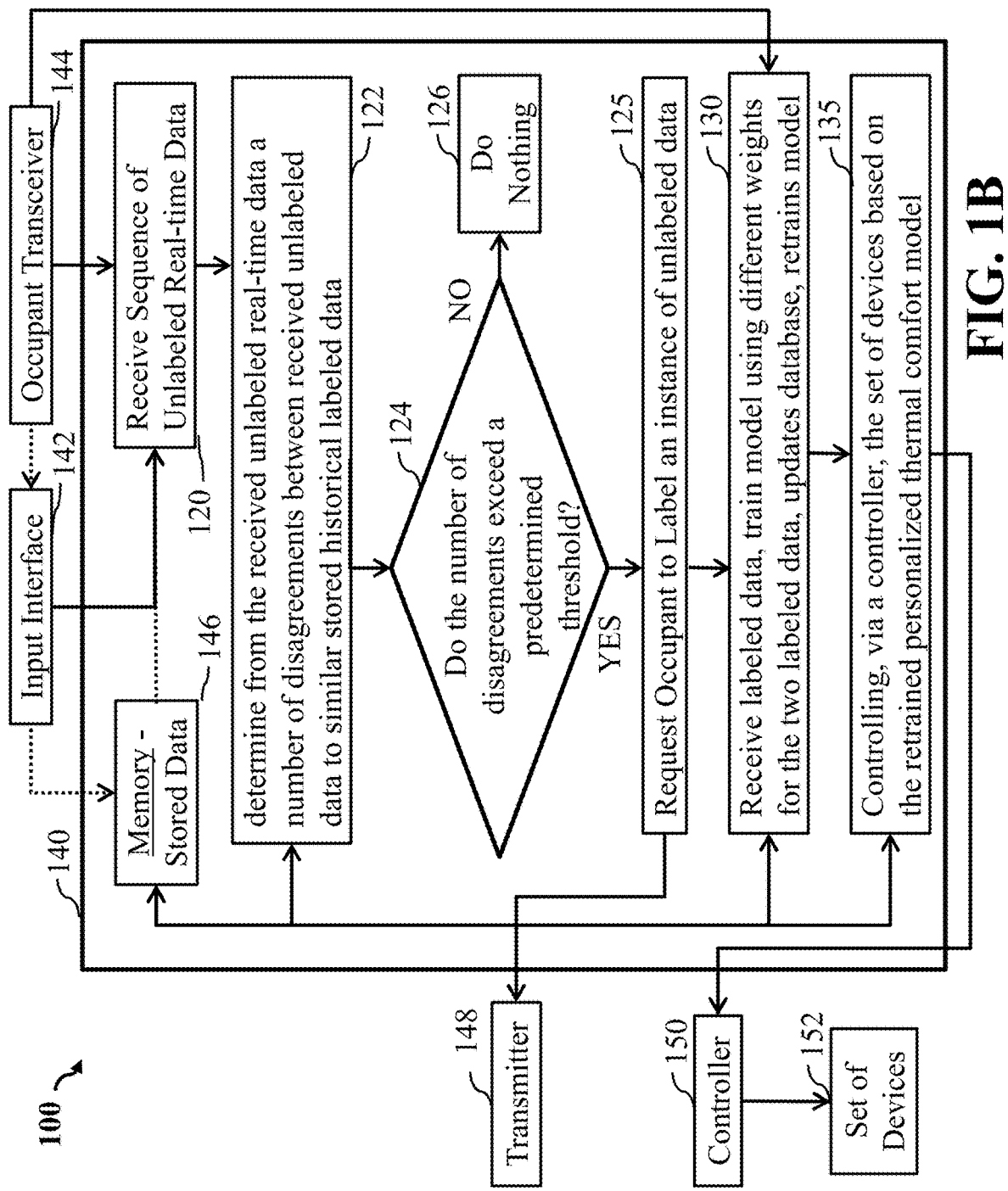
FIG. 1B is a block diagram illustrating the system of FIG. 1A, implemented using some components of the system, according to embodiments of the present disclosure.

FIG. 1B is a block diagram illustrating the system of FIG. 1A, wherein the system is implemented using some components, according to embodiments of the present disclosure. FIG. 1B can include a hardware processor 140 in communication with an input interface 142, occupant transceiver 144, a memory 146, a transmitter 148, a controller 150. The controller can be connected to the set of devices 152. The occupant transceiver 144 can be a wearable electronic device that the occupant (user) wears to control the set of devices 152 as well as can send and receive information.

It is contemplated the hardware processor 140 can include two or more hardware processors depending upon the requires of the specific application. Certainly, other components may be incorporated with method 100 including input interfaces, output interfaces and transceivers.

Still referring to FIG. 1B, aspects of the system 100 include step 120 of receiving a sequence of unlabeled real-time data from the input interface 142. Step 122 includes determining from the unlabeled real-time data similar stored historical data, and the disagreement between the labeled instances and the predicted label of the unlabeled data instance. Step 124 includes a decision of comparing the determined disagreement from step 122 to identify if exceeds a predetermined threshold? Step 126 results in not exceeding the predetermined threshold, i.e. NO. Step 125 results in exceeding the predetermined threshold, i.e. YES, wherein a request to the occupant is made via transmitter 148, to label an instance of the unlabeled data. Step 130 includes receiving an occupant response via transmitter 148, of the occupant labeling the instance of unlabeled data, i.e. personal labeled data, which is stored in the memory. Step 135 includes updating the personalized labeled database with the stored occupant labeled instance of unlabeled data, and retrains the personalized thermal comfort model using the historical thermal comfort model and the updated personalized database.

Figure 1C:
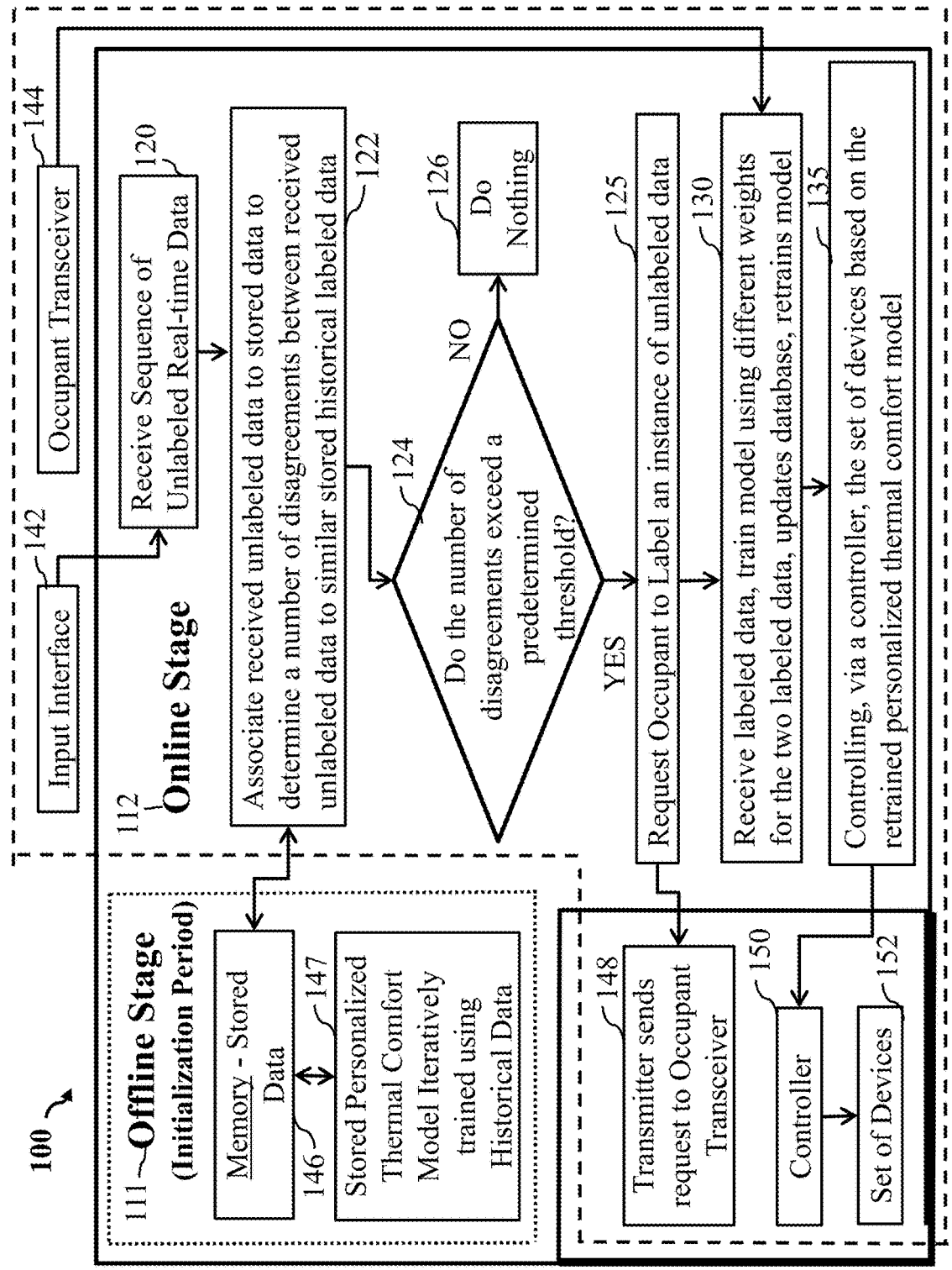
FIG. 1C is a block diagram illustrating the system of FIG. 1A, showing an offline stage and an online stage, according to embodiments of the present disclosure.

FIG. 1C is a block diagram illustrating the system of FIG. 1A, showing an offline stage and an online stage, according to embodiments of the present disclosure.

System 100 can consist of two stages and an offline stage 111 and an online stage 112. The offline stage 111 iteratively trains the personalized thermal comfort model 147 during an initialization period. The iterative training can be based on a regularization of the personalized thermal comfort model with respect to the stored historical thermal comfort model in the memory 146. The regularization provides for limiting the search space for training the personalized thermal comfort model during the initialization period. In particular, the regularization uses different weights of the personalized thermal comfort model as a function of the received personalized labeled data stored in a personalized database in the memory, as compared to weights of the historical thermal comfort model which are determined on stored historical labeled data in a historical database in the memory.

Still referring to FIG. 1C, the online stage 112 can include an input interface 142 to receive a sequence of unlabeled real-time data including measurements of biometric data of the occupant, measurements of environmental data in the environment the occupant is located, or both. The input interface 142 can be connected to the memory 146 and step 120. A transmitter 148 can be used to request the occupant to label an instance of unlabeled data (step 125), when there is a disagreement between the labels of stored historical labeled data similar to the received unlabeled data and a predicted label on the unlabeled data point exceeds a predetermined threshold (step 124). In response to the occupant labeling the instance of unlabeled data (step 130), the hardware processor can store the occupant labeled instance of unlabeled data in the memory 146, and can update the personalized labeled database with the stored occupant labeled instance of unlabeled data, and retrain the personalized thermal comfort model using the historical thermal comfort model and the updated personalized database. A controller 150 can be used to control the set of devices 152 based on the retrained personalized thermal comfort model.

Figure 2A:
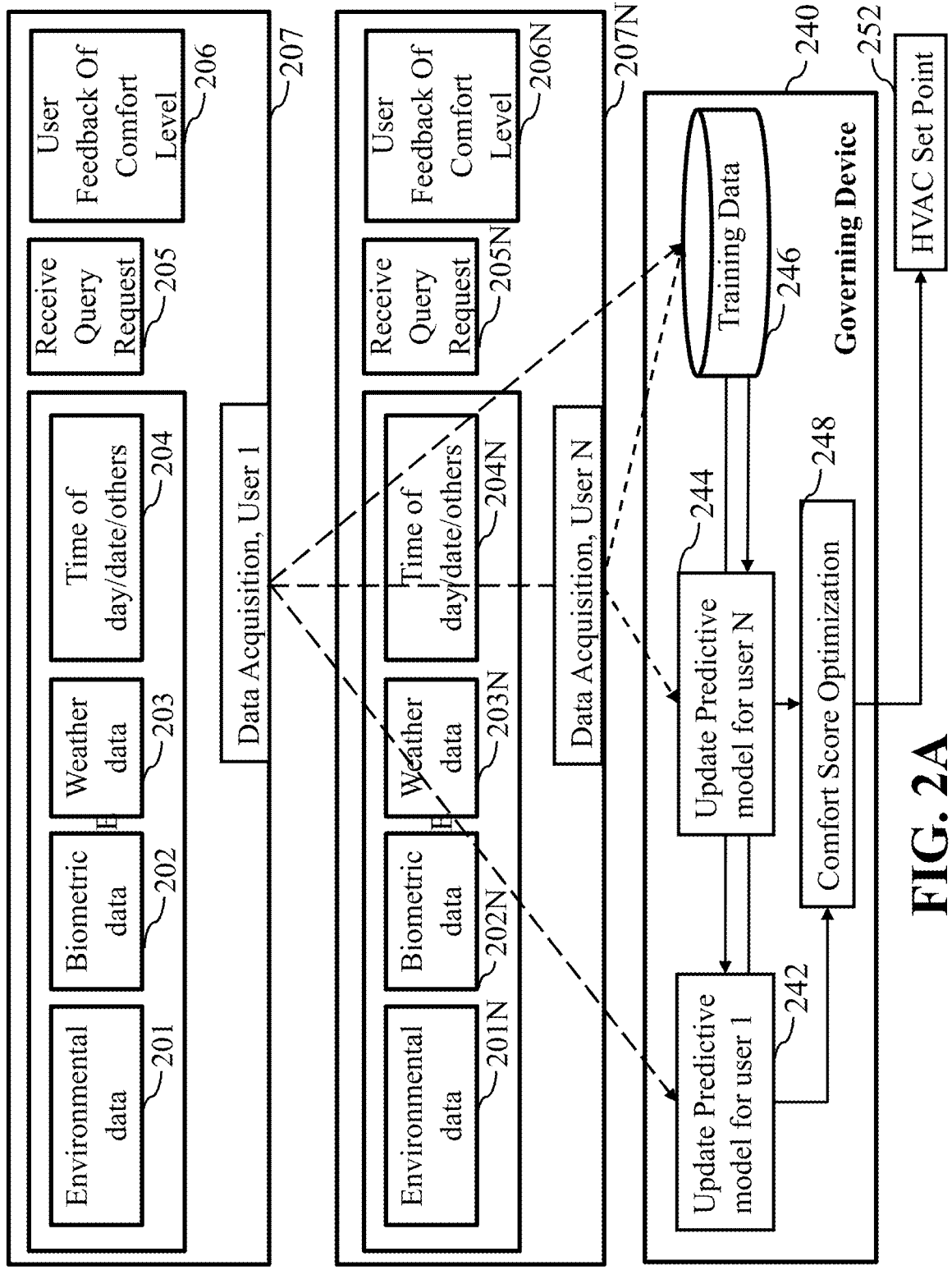
FIG. 2A is a schematic illustrating datacollection from multiple simultaneous users according to embodiments of the present disclosure.

FIG. 2A is a schematic illustrating datacollection from multiple simultaneous users according to embodiments of the present disclosure. For example, FIG. 2A illustrates a combination of a number of occupants 207, 207N when controlling an HVAC system in a shared space to optimize the individual comfort of multiple users.

In particular, FIG. 2A shows that for each of the N users, the system collects data from the user's environemnet (environmental data) 201, the user's body (biometric data) 202, the outside environment (weather data) 203, as well as time information associated with the data 204. Wherein, each user has a method of receiving the a query request (receive query request) 205, and a method of providing feedback to the system (user feedback of comfort level) 206. The data can be aggregated in a database, which is then used to create individual thermal comfort models, as described in the present disclosure. The models are then used by a Comfort Score Optimization algorithm to determine the optimal HVAC setpoint to maximize user thermal comfort.

In other words, FIG. 2A, illustrates users can include, user 1—set of data acuisition 207, along with user N—set of data acuisition 207N, wherein the user data (user 1, 207 and user N, 207N) is in communication with a governing device 240, for example, this may be processor 140, a different processor, or could be multiple processors in communication with each other, depending upon the particular application. Within the governing device 240, by non-limiting example, can be an update predictive model for user 1, 242, in communication with an update predictive model for user N, 244, in communication with training data 246. Wherein the predictive model for user 1, 242 and predictive model for user N, 244, can be in communication with a comfort score optimization 248, which is in communication with a HVAC set point 252.

Figure 2B:
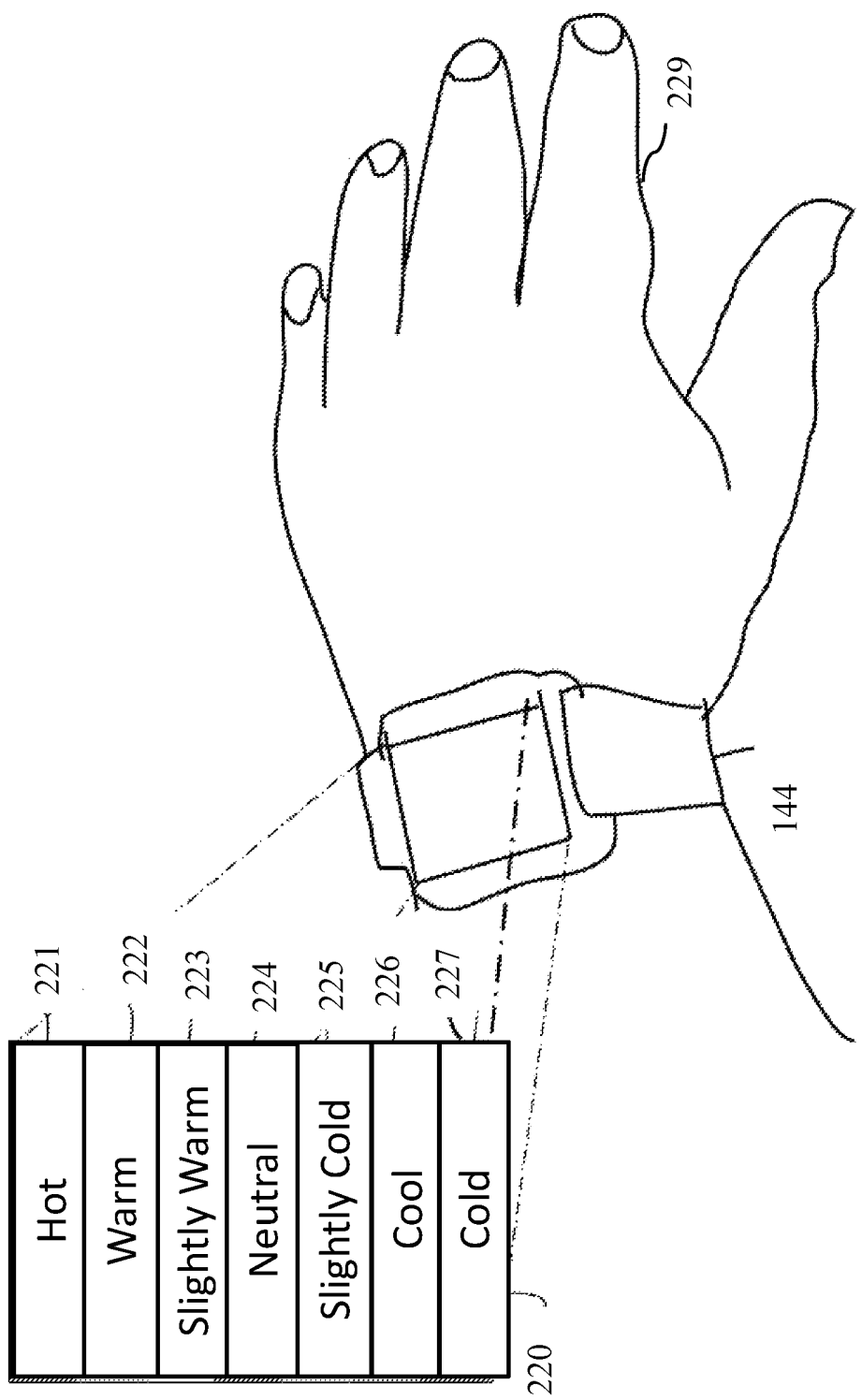
FIG. 2B is a schematic illustrating a wearable device by an occupant in an environment that can measure biometric data of the occupant, as well as measure environmental data in the environment or obtain measured environmental data in the environment, according to embodiments of the present disclosure.

FIG. 2B is a schematic illustrating a wearable device by an occupant in an environment that can measure biometric data of the occupant, as well as measure environmental data in the environment or obtain measured environmental data in the environment, according to embodiments of the present disclosure.

For example, the wearable device 144, can be worn by an occupant 229, where biometric data of the occupant can be measured/collected. For example, types of biometric data, by non-limiting example, can include variations, or a scaling of 220 how the occupant may be feeling at a particular time within the environment, i.e. hot 221, warm 222, slightly warm 223, neutral or possibly comfortable 224, slightly cold 225, cool 226 or cold 220. Of course, the above variations can be presented differently, such as by numbers ranging from 1 to 10, 1-100, etc, or by letters, or some other similar aspect to indicate how the occupant may be feeling at a particular time within the environment.

The wearable device 144 may also measure environmental data in the environment, or obtain measured environmental data in the environment, according to embodiments of the present disclosure. At present the figure shows the wearable device with the thermal comfort levels overlayed. This demonstrates a possible scale on which the user can provide feedback. Alternate methods which may be used by a user include but are not limited to, feedback using the user's voice, or gestures.

Figure 3:
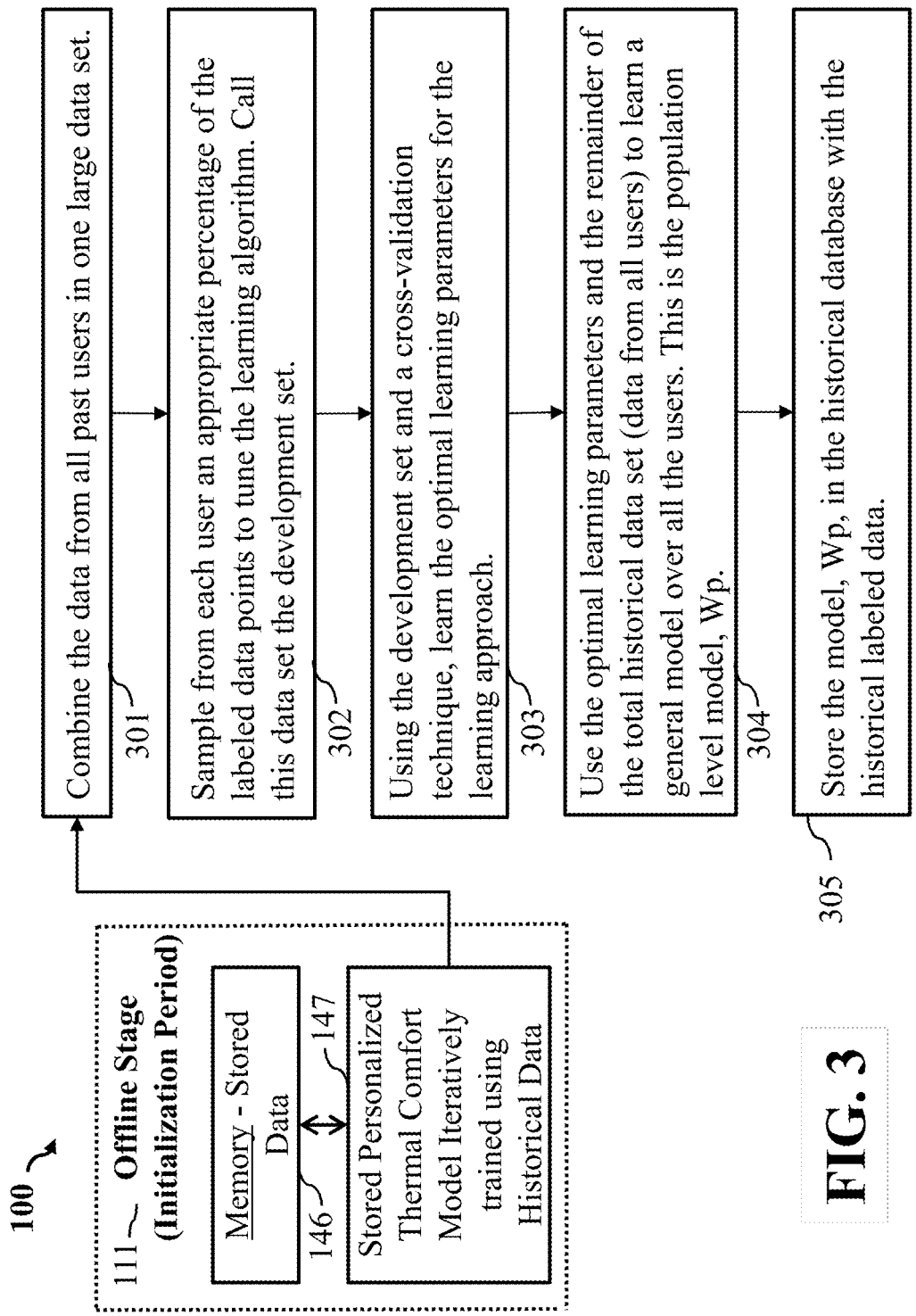
FIG. 3 is a block diagram illustrating the offline stage of the system of FIG. 1C, according to embodiments of the present disclosure.

FIG. 3 is a block diagram illustrating the offline stage of the system of FIG. 1C, according to embodiments of the present disclosure. FIG. 3 shows how the population level model, Wp, can be determined. The population level mode, Wp, is the model used to describe the labeled data in the historical database. To determine Wp, combine all labeled data from the historical database (all users) into a single large data set. Then, sample from each user's data, and appropriate percentage to tune the learning parameters of the personal thermal comfort learning algorithm. Followed by naming this new data set, which can be the development data set. Use the development data set and a cross-validation technique to determine any modeling parameters that are needed. Then, using the remainder of the large dataset, and the learned modeling parameters, learn the population level model, Wp, on the labeled historical database. Store the results and the data in the historical database.

Figure 4A:
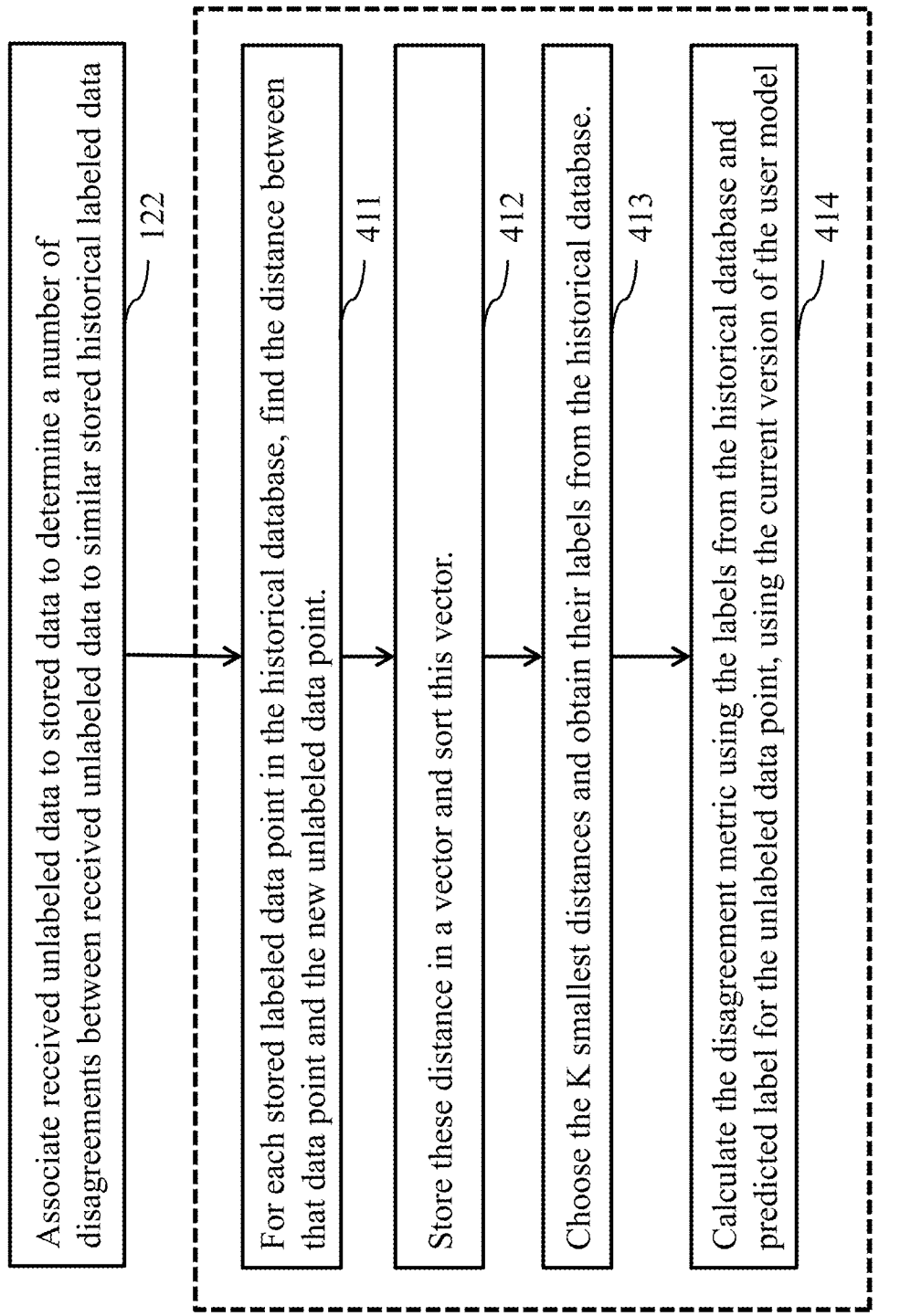
FIG. 4A is a block diagram illustrating aspects of the online stage of the system of FIG. 1C, according to embodiments of the present disclosure.

FIG. 4A is a block diagram illustrating aspects of the online stage of the system of FIG. 1C, according to embodiments of the present disclosure. FIG. 4A can include how to determine the disagreements score between the labels of instances of the labeled historical data similar to the current unlabeled data point and a perdicted label of the unlabeled data point.

For example, step 122 refers to the aspect of associating received unlabeled data to stored data to determine a number of disagreements between received unlabeled data to similar stored historical labeled data.

Step 411 of FIG. 4A explains that for each stored labeled data point in the historical database, find the distance between that data point and the new unlabeled data point.

Step 412 of FIG. 4A includes storing these distances in a vector and sort this vector.

Step 413 of FIG. 4A explains choosing the K smallest distances and obtain their labels from the historical database.

Step 414 of FIG. 4A illustrates how to calculate the disagreement metric using the labels from the historical database and predicted label for the unlabeled data point, using the current version of the user model.

In other words, to calculate the disagreement score, first (411), find the distance between the new unlabeled data point and all data points in the labeled historical database. Second (412), store these distances in a vector and sort this vector, i.e. sort these distances. Third (413), choose the K smallest distances and obtain their labels from the historical database. Fourth (414), predict a label for the unlabeled data point and then calculate the disagreement score, i.e. calculate the disagreement metric using the labels from the historical database and predicted label for the unlabeled data point, using the current version of the user model.

Figure 4B:
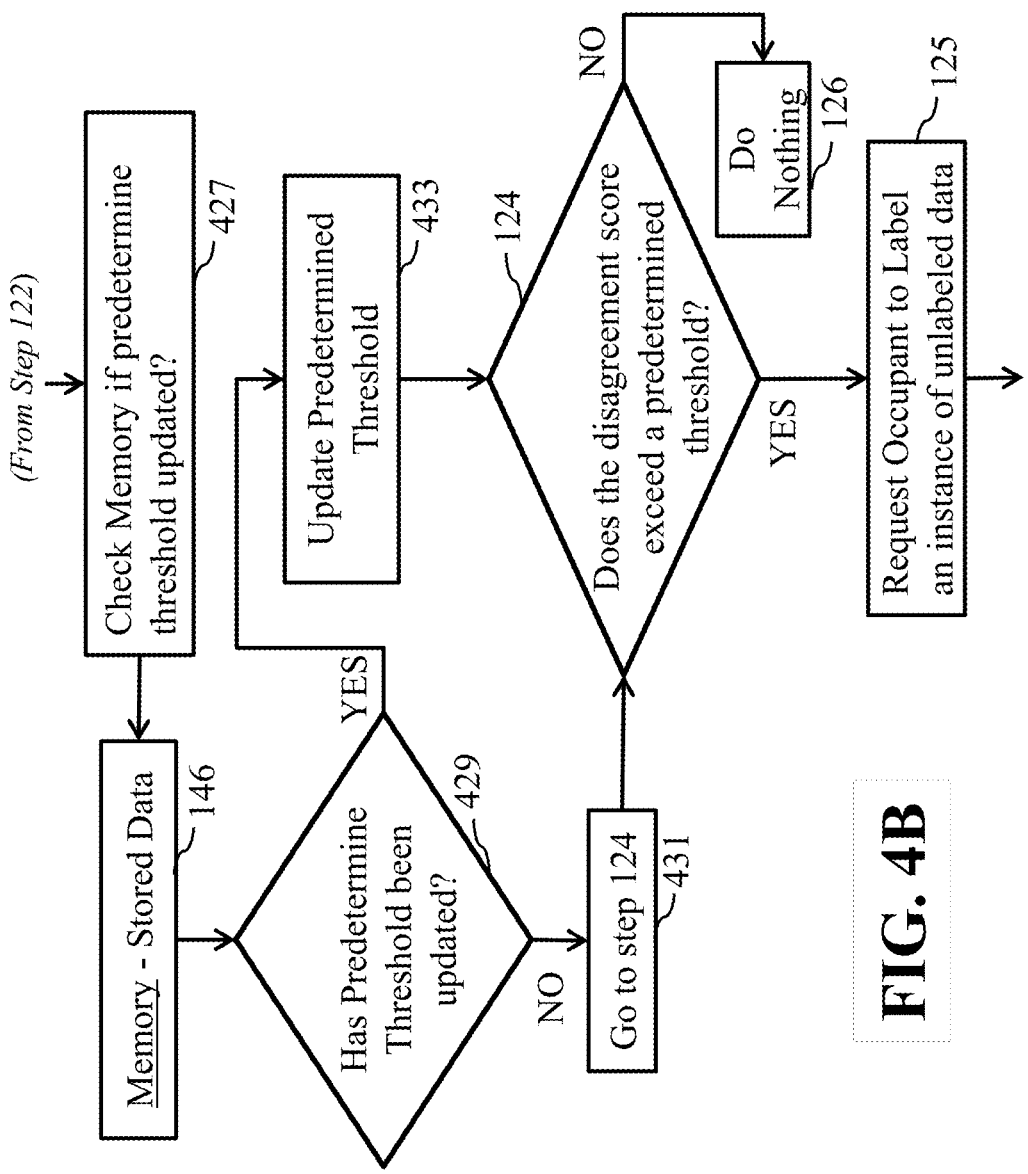
FIG. 4B is a block diagram illustrating aspects of the online stage of the system of FIG. 1C, regarding the disagreement score, according to embodiments of the present disclosure.

FIG. 4B is a block diagram illustrating aspects of the online stage of the system of FIG. 1C, according to embodiments of the present disclosure. For example, FIG. 4B can include after step 122 of FIG. 1C, i.e. associate received unlabeled data to stored data to determine a number of disagreements between received unlabeled data to similar stored historical labeled data, step 427 which is a step to check the memory if the predetermined threshold has been updated.

Step 146 is the memory, wherein step 429 is the step to determine if the predetermined threshold has been updated? If no 431, then go to step 124. If yes 433, update predetermined threshold and go to step 124.

Step 124 of FIG. 4B includes determining if the disagreement score exceeds a predetermined threshold? If yes, if the disagreement score exceeds a predetermined threshold, then the system requests a label from the occupant 125. If the disagreement score does not exceed the threshold, then no action is taken 126.

Figure 4C:
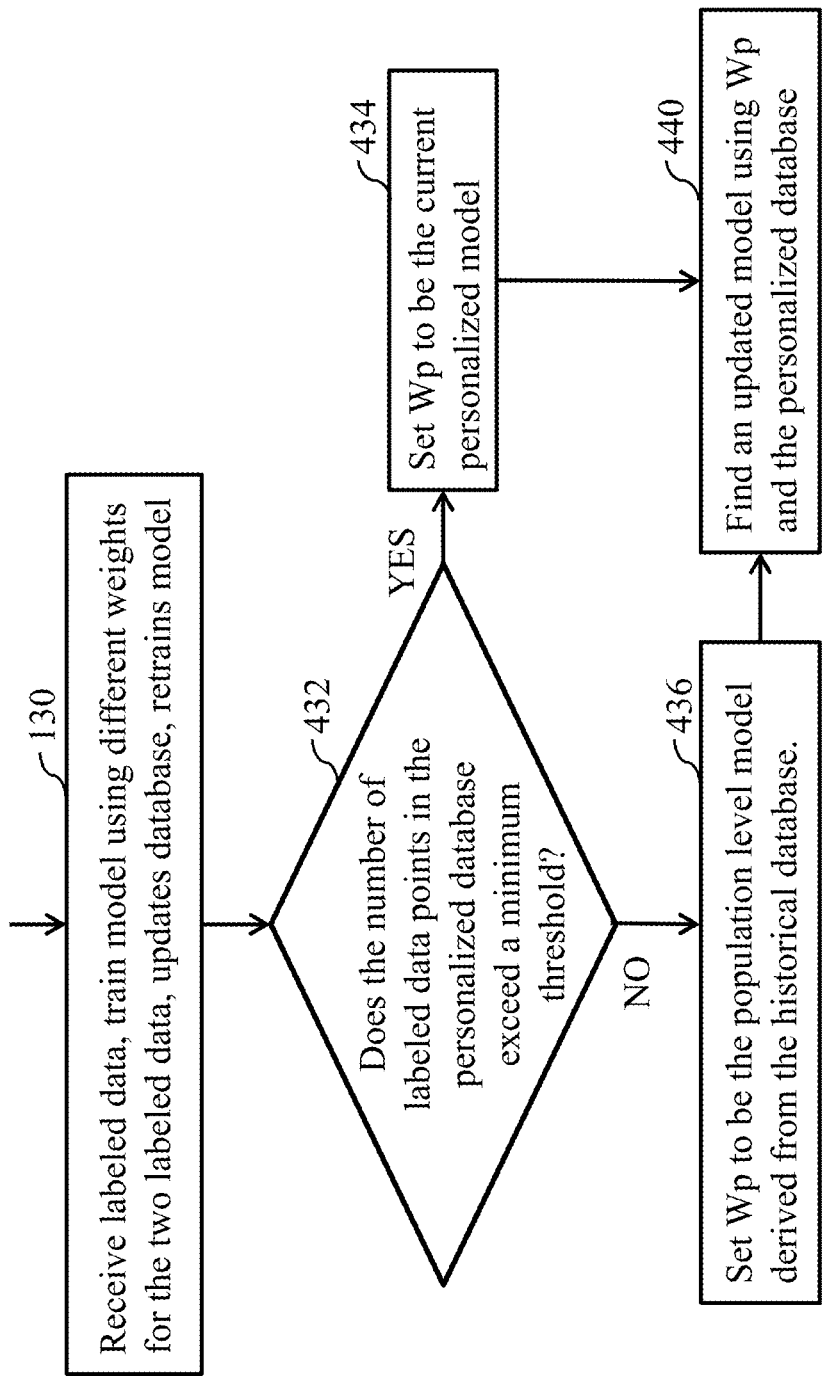
FIG. 4C is a block diagram illustrating aspects of the online stage of the system of FIG. 1C, regarding more aspects of the disagreement score, according to embodiments of the present disclosure.

FIG. 4C is a block diagram illustrating aspects of the online stage of the system of FIG. 1C, according to embodiments of the present disclosure. For example, FIG. 4B can include step 130, according to embodiments of the present disclosure, how to obtain a personalized thermal comfort model once a user label has been obtained.

Step 432 of FIG. 4C includes a decision regarding whether the number of labeled data points in the personalized database exceed a minimum threshold?

Regarding step 434 of FIG. 4C, if YES, the number of labeled data points in the personalized database exceed the minimum threshold, then go to step 434. Then, Wp, the population level model learned using the historical database, is set to be the current personalized model, which the next step is step 440. Then, go to step 440 which includes finding an updated model using the Wp and the personalized database.

Regarding step 436 of FIG. 4C, if NO, the number of labeled data points in the personalized database do not exceed the minimum threshold, then go to step 436. Then, Wp, the population level model is derived from the historical database.

Transfer Active Learning Framework for Thermal Comfort Prediction

Notation

In introducing aspects of the present disclosure, first introduced is some notation. For example, assume that a dataset D is given, which contains n labeled samples of the form $D=(x^i, y^i)\ \forall i \in \{1n\}$. Here each $x^i$ correspond to a feature vector, each real valued, $x^i \in R^p$, and each corresponding to data from wearable and ambient room sensors. The index i denotes the sample number while p denotes the length of the vector which corresponds to the number of features used in the prediction model. For convenience the n labeled data samples are all expressed as matrix, which we call the design matrix, X, with n rows and p columns. The target values $y^i$ are drawn from a pre-defined set, $y^i \in \{0,\pm1,\pm2,\pm3\}$. These correspond to thermal comfort rating given as feedback from the users.

At least one goal of the present disclosure, among many goals, is to learn a prediction model, h, $h:x \rightarrow y$ that for any input vector x outputs a prediction target value $\hat{y}=h(x)$. Because in this particular example the prediction model is learned using a regression, stipulated is that the predicted target value must not deviate more than ε, in the squared sense, from the actual target value $\hat{y}$ as $(y-\hat{y})^2 < \varepsilon$.

Using Historical Data for Transfer Learning

For the development in this area, the target values, y, are treated as continuous values that are restricted to the range $\{-3,+3\}$. The inherent assumption here is that while users are forced to discretize their state into 7 levels, in practice their thermal comfort is much more nuanced.

Treating the problem of thermal comfort prediction as a regression problem addresses the problem of class imbalance. In particular because most users are in an HVAC controlled space, we anticipate that most feedback received will be in the range $\{-1,+1\}$ leading to severe class imbalances for the very cold, cold, hot and very hot classes. Thus using regression methods is a natural approach when training thermal comfort predictors.

To demonstrate the approach simply, a linear regression is used. Linear regression can provide an easier quantification of the effect of each feature on the model output. To determine a linear regression, we need to find a weight vector, W, such that the multiplication between the design matrix and the weight vector produces an estimate of the target values, $\hat{y}$), $$X^T W = \hat{y}. \tag{1}$$

An approach to finding the regressor weight vector is called ordinary least squares (OLS), where the goal of OLS, among other things, is to minimize the squared sum of the differences between the estimated target values and the real target values. These differences are called the residuals and the sum of the residuals, often written as an optimization objective is expressed as, $$PX^T W - y P_2. \tag{2}$$

The OLS estimate of W is prone to high variance in the model weights and poor allocation (selection) of the weights among the features. Furthermore the classical, analytical solution to this problem is not well posed, suffering from numerical issues in the event that the data matrix is not easily invertible.

To remedy these issues, a penalty is introduced on the regressor weight vector. In this area the penalty takes the form of the 2-Norm, which means that the equations below follow the Ridge Regression framework. Here the 2-Norm is chosen because of its more beneficial treatment of correlated features. The added penalty parameter reduces the model variance and results in a solution where some feature weight may be close to zero. This is often referred to as feature selection. The new objective function to solve is thus, $$PX^T W - y P_2 + \lambda P W P_2. \tag{3}$$

In equation (3), λ, is the penalty parameter that determines the weight of the penalty term in the solution. Increasing λ leads to smaller weight coefficients in W, and decreasing λ leads to larger weight coefficients in W. Because of this, λ is said to control the shrinkage of the regressor coefficients.

Classically, when utilizing Ridge Regression, the shrinkage parameter is optimized such that the coefficients are driven towards zero without compromising the model error performance. This classical approach to Ridge Regression has a Bayesian interpretation where the weight vector coefficients are sampled from a prior normal distribution with mean zero and $$\text{variance} = \sqrt{\frac{1}{\lambda}}.$$

An alternate approach to Ridge Regression is to shrink the coefficients towards a non-zero prior distribution. When this approach is taken, the non-zero prior distribution represents some prior knowledge about the problem. In this case, it is said that the shrinkage of the coefficients toward the prior distribution induces a transfer of domain knowledge because the weight vector we find should be as close to the prior distribution as possible. The modified ridge OLS has the following form, $$PX^T W - yP_2 + \lambda PW - W_p P_2. \quad (4)$$

In equation (4), $W_p$, the population level model which is obtained from the historical database, is a vector containing a sample regressor vector. This vector represents the mean of the prior distribution described above. Note that setting $W_p$ to zeros results in the classical ridge OLS from equation (3).

Multiple approaches exists to estimate the prior regressor, $W_p$, according to the present disclosure. In this area, it is assumed that there are strong similarities between users, and that the model must only be slightly modified to fit a new individual. This assumption is rooted in the physiology of thermoregulation, which does not differ from one person to the next. It is simply the preferences of the individual that differ.

One convenient prior for transfer learning in the case of thermal comfort modeling is a general thermal comfort over a group of users. That is, suppose that we have N data sets collected from N distinct users. Then we can find a general linear regressor, using equation (3), that describes the data from N-1 users. We call this regressor our population model, $S_p$. We then use equation (4).

Solving equation (4), will then yield the personalized thermal comfort model for the $N^{th}$ user. This approach to introducing a prior intuitively captures the idea that new user's coefficients, W, should be as mostly similar to other users while allowing for individual differences.

Setting this problem specifically as an optimization, the ridge regression coefficients are learned by minimizing the following objective function, $$\hat{W}^{ridge} = _W(PX^T W - yP_2 + \lambda W - W_p P_2). \quad (5)$$

In this formulation, the first term is the loss function, which has the usual format of equation (3), the second term penalizes the deviation of ridge coefficients of the new model W from the prior model $W_p$. Taking the derivative of this objective with respect to the new regressor weight vector W and setting it equal to zero results in analytical solution, which we term modified ridge regression, $$\hat{W}^{ridge} = (X^T + \lambda I)^{-1}(X^T + \lambda W_p). \quad (6)$$

Incorporating Active Learning

At least one goal of this framework is to create regression models that predict personal thermal comfort but do not require the collection of a large training data set from each user. So far we have introduced the transfer learning component of the framework, however, in order to personalize the model to the $N^{th}$ user, this user must provide feedback. Combining active learning with transfer learning is a logical approach to reducing the labeling effort for thermal comfort modeling.

In pool-based active learning, solutions often begin with the introduction of, A, the pool of all available examples that are yet to be labeled and, L, the set of labeled examples which are chosen through some active learning strategy. Importantly, in the pool-based setting all labels exists, but there is some associated cost of obtaining the label that is to be minimized through sample selection. The overall goal of active learning is to choose an optimal subset of m (where m<<n) labeled examples L such that it achieves good generalization performance on the test set.

There are two important components of active learning; the labeling budget and the querying strategy. The labeling budget is simply the total number of labels that can be obtained. In the context of personalized thermal comfort modeling this is the number of labels that each user is allowed to be asked. Because in this problem the user should not be disturbed frequently, the labeling budget should be as small as possible.

The querying strategy is the approach used to determine which examples in the set A should be labeled. In this paper we propose a modified QBC approach. In a typical QBC approach, the labeled data set L is used to update the committee members. Here we choose not to update the committee members, but instead we update only the $N^{th}$ user's current predictive model. There are two reasons for choosing to update $N^{th}$ user's predictive model: first, a labeled example from the $N^{th}$ user could benefit only those committee members that exhibit a significant overlap in thermo-regulatory behavior. The consequence of using labeled examples to update committee members who are significantly different will result in noisy predictions when issuing subsequent queries; second, the goal of this work is to develop personalized prediction models with as few labeled examples as possible and hence updating the $N^{th}$ user's predictive model gets us towards that goal quickly. The proposed QBC strategy is thus to choose examples which cause the committee members and the $N^{th}$ user's predictive model to maximally disagree. Intuitively this means that the proposed QBC technique prefers examples for which the $N^{th}$ user's model is uncertain about but the committee is fairly certain about.

At least one key point to address here, among other key points, is the notion of disagreement. As previously mentioned, we evaluate disagreement between stored data that is similar to the unlabeled new data. As an example, here lets define a sample disagreement score, $d_i$, for the $i^{th}$ example in A is computed as, $$d_i = \left| \left( \frac{1}{C} \sum_{c=1}^{C} \hat{y}_c^i \right) - y_L^i \right| \quad (7)$$

In a classical Active Learning interpretation, the quantities in equation (7) are defined as follows. C is the number of committee members, $\hat{y}_c^i$ is the prediction associated to the $c^{th}$ committee member and $\hat{y}_L^i$ corresponds to the prediction made by the $N^{th}$ user's prediction model which has been trained only using the labeled examples, L, obtained thus far. It is important to note that this disagreement score uses models from the historical data. Later we will describe the disagreement score using only the K nearest neighbours. This disagreement score accommodates individual differences in thermo-regulatory behavior, for example the layering of clothes, while focusing on difference that may arise in data set collected from different individuals; for example $N^{th}$ user's model predicts cold when all other users feel hot under similar conditions.

Combining the transfer learning and the active learning, the complete transfer active learning framework can be presented as follows. First a pool of available data examples, A, is created. This pool contains all data from the historical database. Next the pool is used to learn a machine learning model (ridge regression). This model is termed the population level model $W_p$. This population level model is used for transfer learning to the new user.

After the initial models are created, the algorithm seeks to learn a personalized model using a budget number of queries to the user. Each query seeks to discover a label for the corresponding data point. Once a label is obtained for the personalized database, the training data set has been updated and the ridge regression model penalized by the population model is retrained.

The model is considered personalized when the training budget is exhausted. At this point the user may choose to continue labeling data point, but the algorithm will not actively seek to query the user. If the user then labels a sufficiently large number of data points, the personalized model itself may be used in the information transfer from one day to the next.

Data Partitioning and Preprocessing

Having collected the data, an important question is how to best split the complete dataset into training and testing datasets. The optimal choice of this split is a study parameter that needs to be empirically evaluated, however for this work the labeled dataset was split into two halves for each day of the experiment and for each user. The first half is used to train and the second half is used to test the comfort prediction model.

Each collected feature is centered by subtracting the mean and dividing by the standard deviation to bring all features to the same scale. This ensures that no single feature will dominate the regression model. Both train and test datasets were transformed using the mean and standard deviation computed only on the training partition of the dataset within each user. User ratings were also centered using, again, normalization coefficients derived from the training data. Here only the mean was subtracted from each rating. Normalizing the user ratings obviates the need to fit an intercept in regression settings.

Active Learning—Querying Strategies

For this are two strategies can be used. However, this does not imply that these are the only strategies that would work with the present disclosure. Each strategy is based on the pool-based active learning setting, which has been optimized for the streaming setting which is the natural setting of this work.

The first active learning strategy leverages a K nearest neighbors approach (QBC-K). The main idea of this labeling strategy is to compute the disagreement score for all available examples in the pool, A. Then from this set of disagreement scores, the example chosen is that which had the maximum disagreement score. The label for this example is queried.

We compute the disagreement score as in equation (7), the first term, $\hat{y}_c^i$, we set C to equal K nearest neighbors. Then compute the mean rating over the K nearest neighbors, where neighbors correspond to labeled examples from N−1 users and the notion of nearest is defined by Euclidean distance. The number of neighbors used in the estimate of the mean user ratings was empirically tested for neighbor values K=5,10,15,20. Of these, it was observed that 10 neighbors yielded optimum performance. The second term in equation (7), $\hat{y}_L^i$, is computed using the $N^{th}$ user's current prediction model which is trained only using labeled examples L. Specifically at budget, B, L would hold atmost B labeled examples, all from the $N^{th}$ user. This strategy is a model-based querying strategy which utilizes the model of the $N^{th}$ user. Therefore, the prediction model is retrained after each labeling point is added to L.

In the second active learning strategy, each of the N−1 users is treated as a committee member who is allowed to make a prediction for all available examples in A. That is, for each committee member a thermal comfort model is learned using only data from that user. A 5-fold cross-validation over each user's data is performed to choose hyperparameters. Each committee member then predict a thermal comfort rating for all available examples in the pool. Then a weighted mean of the committee ratings is computed for each sample. Higher weights are assigned to users that overlap with the $N^{th}$ user in feature space. These weights are computed as inverse of AUROC between $N^{th}$ user and N−1 users in pairs. The remaining details of the strategy are the same as above in the first strategy.

An aspect of the present disclosure is that the system assists in identifying accurate personalized thermal comfort models that reduce the need for collecting large sets of labeled data from new users of the system. Namely, the realization that a personalized thermal comfort model can be learned with a hybrid approach using both the labeled data provided by a user of that personalized thermal comfort model, and labeled data provided by other users, i.e. historical occupant data. For example, learned through experimentation is that modeling thermal comfort for an individual varies in two important ways. First, personal thermal comfort varies from one individual to the next, often this variation can be explained by gender, ethnicity, location, and season. Second, personal thermal comfort can vary within the individual because of their physical state, including conditions such as tiredness and sickness.

Features

According to aspects of the present disclosure, the personalized thermal comfort model can be one or combination of a regression function, a neural network, a classifier or a support vector machine. An aspect can also include the personalized thermal comfort model prior to being stored in the memory, being initialized with the historical labeled data and a transfer learning algorithm. Further, the personalized thermal comfort model is iterative pre-trained, prior to being stored in the memory, based on a regularization of the personalized thermal comfort model with respect to the stored historical labeled data, which limits a search space for training the personalized thermal comfort model during the initialization period. It is possible that the weights for the personalized thermal comfort model correspond to parameters for a machine learning model including one of a regression function, a neural network, a classifier, a support vector machine.

Another aspect of the present disclosure can include the measurements of the occupant labeled data include controlled parameters controlled by the set of devices and parameters uncontrolled by the set of devices. Wherein the controlled parameters include one of or a combination of a temperature, a humidity or an airspeed, and the uncontrolled parameters include one of or a combination of a heart rate, a skin temperature, a galvanic skin response, an altimeter reading, a gyroscope reading, an accelerometer reading, a light level indicator or a clothing sensor. Or, wherein the controlled parameters are determined by optimizing a predicted thermal comfort level of the occupant according to the trained personalized thermal comfort model, by separating the uncontrolled parameters and the controlled parameters in groups within that instance of real-time data, using an optimization method to determine a value for each controlled parameter for the controlled parameters, so that a resulting personalized thermal comfort model outputs a predicted thermal comfort level of the occupant which maximizes the occupant's comfort according to a thermal comfort scale, and then, the controller directs the set of devices according to at least one parameter of the set of optimal controlled parameters.

Another aspect of the present disclosure can include the training of the personalized thermal comfort model is based on an inductive transfer learning algorithm that is a type of machine learning for a regression approach, that uses the stored historical labeled data and personalized labeled data, such that all personalized labeled data is assumed inaccessible or unknown. Further still, the iteratively training of the personalized thermal comfort model uses the real-time data and an active learning algorithm, such that the iterative training continues until a level of accuracy of the personalized thermal comfort model is above a threshold, then the iterative training of the personalized thermal comfort model is only trained with the received occupant labeled real-time data.

It is possible that data is received in real-time, such that the received measurements of biometric data of the occupant include one of or a combination of a heart rate, a skin temperature, a galvanic skin response, an altimeter reading, a gyroscope reading, an accelerometer reading, a light level indicator or a clothing sensor. Also, that the occupant can be a user of the set of devices and has control of the set of devices via an electronic device or a wearable electronic device.

Another aspect can include the thermal comfort levels of the occupant include a cold comfort range, a cool comfort range, a comfortable comfort range, a warm comfort range and a hot comfort range. Further still, the thermal comfort levels selected by the occupant in the environment can be initiated by the system using an active learning algorithm based on the real-time data. Another aspect is that the measurements of environmental data in the environment include at least one of a temperature, a brightness, a sound, an amount of airflow or an amount of sunlight, or some combination thereof, and the set of devices is one of a thermostat in communication with the system, an air condition and heating system for changing a temperature of the environment.

It is possible an aspect can include the personalized thermal comfort model is one or combination of a regression function, a neural network, a classifier or a support vector machine. Also that, the weights for the personalized thermal comfort model correspond to parameters for a machine learning model including one of a regression function, a neural network, a classifier, a support vector machine.

Figure 5:
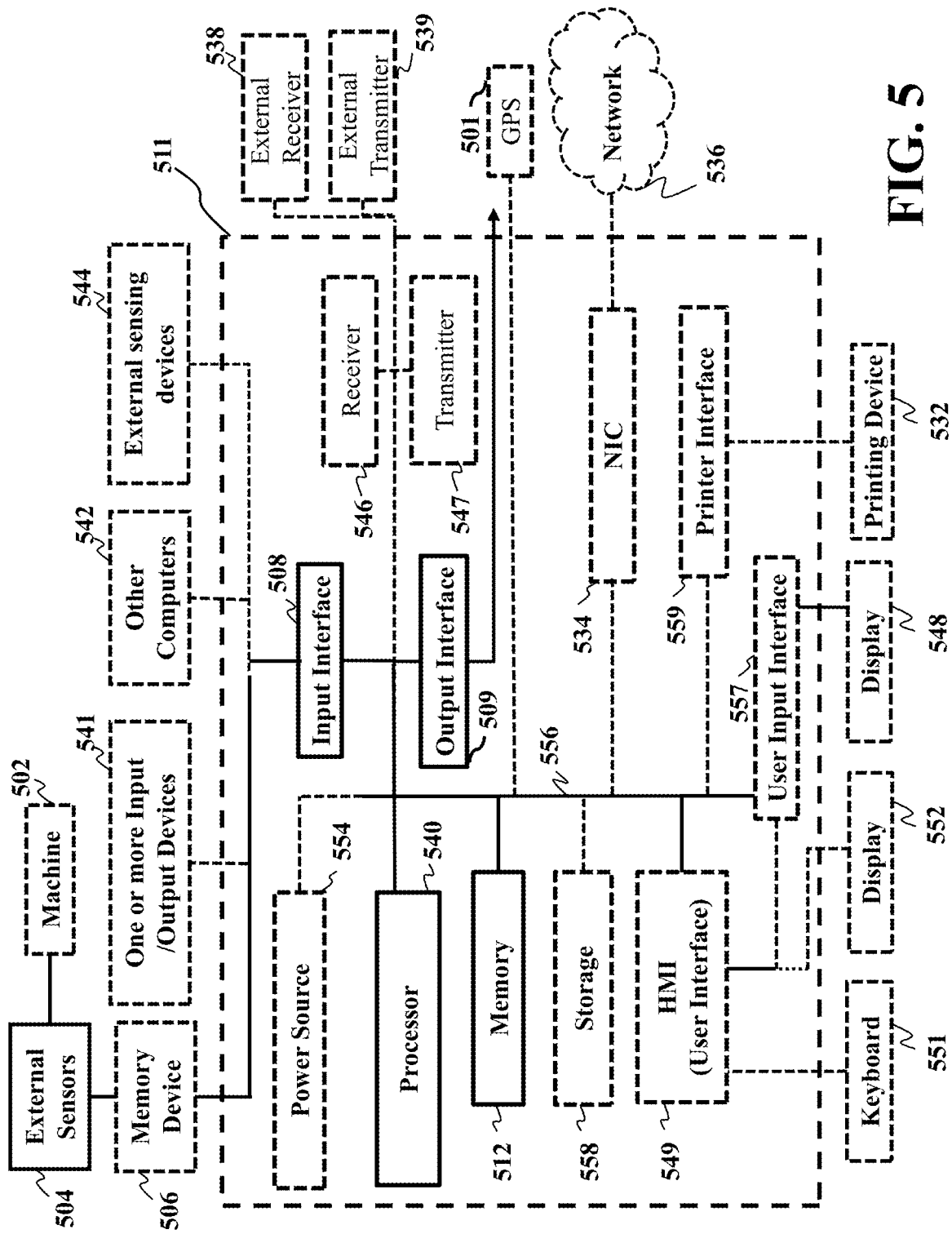
FIG. 5 is a block diagram illustrating the methods of FIG. 1A and FIG. 1B, that can be implemented using an alternate computer or processor, according to embodiments of the present disclosure.

FIG. 5 is a block diagram of illustrating the method of FIG. 1A, that can be implemented using an alternate computer or hardware processor, according to embodiments of the present disclosure. The computer 511 includes a hardware processor 540, computer readable memory 512, storage 558 and user interface 549 with display 552 and keyboard 551, which are connected through bus 556. For example, the user interface 564 in communication with the hardware processor 540 and the computer readable memory 512, acquires and stores the signal data examples in the computer readable memory 512 upon receiving an input from a surface, keyboard surface 564, of the user interface 564 by a user.

The computer 511 can include a power source 554, depending upon the application the power source 554 may be optionally located outside of the computer 511. Linked through bus 556 can be a user input interface 557 adapted to connect to a display device 548, wherein the display device 548 can include a computer monitor, camera, television, projector, or mobile device, among others. A printer interface 559 can also be connected through bus 556 and adapted to connect to a printing device 532, wherein the printing device 532 can include a liquid inkjet printer, solid ink printer, large-scale commercial printer, thermal printer, UV printer, or dye-sublimation printer, among others. A network interface controller (NIC) 534 is adapted to connect through the bus 556 to a network 536, wherein time series data or other data, among other things, can be rendered on a third party display device, third party imaging device, and/or third party printing device outside of the computer 511.

Still referring to FIG. 5, the signal data or other data, among other things, can be transmitted over a communication channel of the network 536, and/or stored within the storage system 558 for storage and/or further processing. Contemplated is that the signal data could be initially stored in an external memory and later acquired by the hardware processor to be processed or store the signal data in the hardware processor's memory to be processed at some later time. The hardware processor memory includes stored executable programs executable by the hardware processor or a computer for performing the elevator systems/methods, elevator operation data, maintenance data and historical elevator data of the same type as the elevator and other data relating to the operation health management of the elevator or similar types of elevators as the elevator.

Further, the signal data or other data may be received wirelessly or hard wired from a receiver 546 (or external receiver 538) or transmitted via a transmitter 547 (or external transmitter 539) wirelessly or hard wired, the receiver 546 and transmitter 547 are both connected through the bus 556. The computer 511 may be connected via an input interface 508 to external sensing devices 544 and external input/output devices 541. For example, the external sensing devices 544 may include sensors gathering data before-during-after of the collected signal data of the elevator/conveying machine. For instance, environmental conditions approximate the machine or not approximate the elevator/conveying machine, i.e. temperature at or near elevator/conveying machine, temperature in building of location of elevator/conveying machine, temperature of outdoors exterior to the building of the elevator/conveying machine, video of elevator/conveying machine itself, video of areas approximate elevator/conveying machine, video of areas not approximate the elevator/conveying machine, other data related to aspects of the elevator/conveying machine. The computer 511 may be connected to other external computers 542. An output interface 509 may be used to output the processed data from the hardware processor 540. It is noted that a user interface 549 in communication with the hardware processor 540 and the non-transitory computer readable storage medium 512, acquires and stores the region data in the non-transitory computer readable storage medium 512 upon receiving an input from a surface 552 of the user interface 549 by a user.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A system for controlling an operation of a heating ventilation and air conditioning (HVAC) system for an occupant in an environment, the system including an input interface to receive data, and a memory having stored a personalized database, and a historical database, the historical database including a generic thermal comfort model learned from labeled data of other users, each instance of the labeled data is indicative of a thermal comfort level according to a thermal comfort scale of at least one other user in different conditions of at least one environment, the system comprising:

a hardware processor is configured to initialize a pre-train personalized thermal comfort (PPTC) model with the labeled data from the other users and a transfer active learning framework that utilizes the generic thermal comfort model for transfer learning while all labeled data from the occupant is assumed inaccessible or unknown, and store the PPTC model in the memory;

receive a sequence of unlabeled real-time data including measurements of biometric data of the occupant and measurements of environmental data in the environment the occupant is located;

calculate a disagreement score by identifying a distance between each unlabeled data point of the sequence of unlabeled real-time data and all data points in the labeled data from the occupant, storing the distances in a vector and sort from a smallest distance to a largest distance, choosing a K smallest distances for each unlabeled data point and obtain their labels from the historical database, predict a label for the unlabeled data point and then calculate the disagreement score using the labels from the historical database and predicted label for the unlabeled data point, using the PPTC model;

request the occupant to label an instance of unlabeled data, via a transmitter, when there is a disagreement between the labels of stored labeled data from the other users similar to the unlabeled real-time data and a predicted label for the unlabeled real-time data instance which exceeds a predetermined disagreement threshold, receive a response to the labeling the instance of unlabeled data such that the labeling is indicative of a thermal comfort level of the occupant, and store the labeled instance of unlabeled data as personalized labeled data in the personalized database;

initiate active learning of the transfer active learning framework by training the PPCT model using different models of the stored labeled data from the occupant compared to the stored labeled data from the other users, and for each iteration during the initialization period, updates the personalized database with the personalized labeled data, and retrains the PPCT model using the historical database and the updated personalized database; and a controller to control the HVAC system based on the retrained PPTC model.

2. The system of claim 1, wherein the PPTC model is one or combination of a regression function, a neural network, a classifier or a support vector machine.

3. The system of claim 1, wherein the the PPTC model is initialized with a transfer learning algorithm.

4. The system of claim 1, wherein the PPTC model is iterative pre-trained, prior to being stored in the memory, based on a regularization of the PPTC model with respect to the stored historical database, which limits a search space for training the PPTC model during the initialization period.

5. The system of claim 1, wherein the models for the PPTC model correspond to parameters for a machine learning model including one of a regression function, a neural network, a classifier, a support vector machine.

6. The system of claim 1, wherein the measurements of the occupant labeled data include controlled parameters controlled by the HVAC system and parameters uncontrolled by the HVAC system.

7. The system of claim 6, wherein the controlled parameters include one of or a combination of a temperature, a humidity or an airspeed, and the uncontrolled parameters include one of or a combination of a heart rate, a skin temperature, a galvanic skin response, an altimeter reading, a gyroscope reading, an accelerometer reading, a light level indicator or a clothing sensor.

8. The system of claim 6, wherein the controlled parameters are determined by optimizing a predicted thermal comfort level of the occupant according to the PPTC model, by
separating the uncontrolled parameters and the controlled parameters in groups within that instance of real-time data,
using an optimization method to determine a value for each controlled parameter for the controlled parameters, so that a resulting PPTC model outputs a predicted thermal comfort level of the occupant which optimizes the occupant's comfort according to a thermal comfort scale, and
then, the controller directs the HVAC system according to at least one parameter of the set of optimal controlled parameters.

9. The system of claim 1, wherein the training of the PPTC model is based on an inductive transfer learning algorithm that is a type of machine learning for a regression approach, that uses the stored historical labeled data and personalized labeled data, such that all personalized labeled data is assumed inaccessible or unknown.

10. The system of claim 1, wherein the iteratively training of the PPTC model uses the real-time data and an active learning algorithm, such that the iterative training continues until a level of accuracy of PPTC model is above a threshold, then the iterative training of the PPTC model is only trained with the received occupant labeled real-time data.

11. The system of claim 1, wherein the real-time data is data received in real-time, such that the received measurements of biometric data of the occupant include one of or a combination of a heart rate, a skin temperature, a galvanic skin response, an altimeter reading, a gyroscope reading, an accelerometer reading, a light level indicator or a clothing sensor.

12. The system of claim 1, wherein the occupant is a user of the HVAC system and has control of the HVAC system via an electronic device or a wearable electronic device.

13. A method for controlling an operation of a heating ventilation and air conditioning (HVAC) system for an occupant in an environment, the occupant is a user of the HVAC system, the method comprising:
using a memory having stored data including a personalized database, and a historical database, the historical database including a generic thermal comfort model learned from labeled data of other users, wherein each instance of the labeled data is indicative of a thermal comfort level according to a thermal comfort scale of at least one other user in different conditions of at least one environment;
using a hardware processor is configured to
initialize a pre-train personalized thermal comfort (PPTC) model with the labeled data from the other users and a transfer active learning framework that utilizes the generic thermal comfort model for transfer learning while all labeled data from the occupant is assumed inaccessible or unknown, and store the PPTC model in the memory;
receiving, via an input interface, a sequence of unlabeled real-time data including measurements of biometric data of the occupant and measurements of environmental data in the environment the occupant is located;
calculate a disagreement score by identifying a distance between each unlabeled data point of the sequence of unlabeled real-time data and all data points in the labeled data from the occupant, storing the distances in a vector and sort from a smallest distance to a largest distance, choosing a K smallest distances for each unlabeled data point and obtain their labels from the historical database, predict a label for the unlabeled data point and then calculate the disagreement score using the labels from the historical database and predicted label for the unlabeled data point, using the PPTC model;
requesting, via a transmitter, the occupant to label an instance of unlabeled data, when there is a disagreement between the labels of stored labeled data from the other users similar to the unlabeled real-time data and a predicted label for the unlabeled real-time data instance which exceeds a predetermined threshold;
receive, a response back from the occupant including labeling the instance of unlabeled data such that the labeling is indicative of a thermal comfort level of the occupant, and store the labeled instance of unlabeled data as personalized labeled data in the personalized database;
initiate active learning of the transfer active learning framework by training PPCT model using different models of the stored labeled data from the occupant compared to the stored labeled data from the other users, and for each iteration during the initialization period, updates the personalized database with the personalized labeled data, and retrains the PPCT model using the historical database and the updated personalized database; and
controlling, via a controller, the HVAC system based on the retrained PPTC model.

14. The method of claim 13, wherein the thermal comfort levels of the occupant include a cold comfort range, a cool comfort range, a comfortable comfort range, a warm comfort range and a hot comfort range.

15. The method of claim 13, wherein the thermal comfort levels selected by the occupant in the environment are initiated by the system using an active learning algorithm based on the real-time data.

16. The method of claim 13, wherein the measurements of environmental data in the environment include at least one of a temperature, a brightness, a sound, an amount of airflow or an amount of sunlight, or some combination thereof, and the HVAC system is one of a thermostat in communication with the system, an air condition and heating system for changing a temperature of the environment.

17. A system for controlling an operation of a heating ventilation and air conditioning (HVAC) system for an occupant in an environment, such that the occupant is a user of the HVAC system and has control of the HVAC system, and the system including an input interface to receive data, and a memory having stored a personalized database, and a historical database, the historical database including a generic thermal comfort model learned from labeled data of other users, each instance of the labeled data is indicative of a thermal comfort level according to a thermal comfort scale of at least one other user in different conditions of at least one environment, the system comprising:

a hardware processor to
initialize a pre-train personalized thermal comfort (PPTC) model with the labeled data from the other users and a transfer active learning framework that utilizes the generic thermal comfort model for transfer learning while all labeled data from the occupant is assumed inaccessible or unknown, and store the PPTC model in the memory;
receive a sequence of unlabeled real-time data including measurements of biometric data of the occupant and measurements of environmental data in the environment the occupant is located;
calculate a disagreement score by identifying a distance between each unlabeled data point of the sequence of unlabeled real-time data and all data points in the labeled data from the occupant, storing the distances in a vector and sort from a smallest distance to a largest distance, choosing a K smallest distances for each unlabeled data point and obtain their labels from the historical database, predict a label for the unlabeled data point and then calculate the disagreement score using the labels from the historical database and predicted label for the unlabeled data point, using the PPTC model;
request the occupant to label an instance of unlabeled data, via a transmitter, when there is a disagreement between the labels of stored labeled data from the other users similar to the unlabeled real-time data and a predicted label for the unlabeled real-time data instance that exceeds a predetermined disagreement threshold;
initiate active learning of the transfer active learning framework by training the PPCT model using different models of the stored labeled data from the occupant compared to the stored labeled data from the other users, and for each iteration during the initialization period, updates the personalized database with the personalized labeled data, and retrains the PPCT model using the historical database and the updated personalized database; and
a controller to control the HVAC system based on the retrained PPTC model.

18. The system of claim 17, wherein the PPTC model is one or combination of a regression function, a neural network, a classifier or a support vector machine.

19. The system of claim 17, wherein the models for the PPTC model correspond to parameters for a machine learning model including one of a regression function, a neural network, a classifier, a support vector machine.

20. The system of claim 17, wherein the measurements of the occupant labeled data include controlled parameters controlled by the HVAC system and parameters uncontrolled by the HVAC system, wherein the controlled parameters are determined by optimizing a predicted thermal comfort level of the occupant according to the PPTC model, by separating the uncontrolled parameters and the controlled parameters in groups within that instance of real-time data,
using an optimization method to determine a value for each controlled parameter for the controlled parameters, so that a resulting PPTC model outputs a predicted thermal comfort level of the occupant which optimizes the occupant's comfort according to a thermal comfort scale, and then, the controller directs the HVAC system according to at least one parameter of the set of optimal controlled parameters.

* * * * *